United States Patent
Schnitz et al.

(10) Patent No.: US 8,803,683 B2
(45) Date of Patent: Aug. 12, 2014

(54) SYSTEM, METHOD, AND DEVICE FOR MEASURING AND REPORTING CHANGING LEVELS OF LIQUIDS IN STORAGE TANKS

(75) Inventors: Benjamin A. Schnitz, Nashville, TN (US); Claude T. Masters, Jupiter, FL (US); George D. Survant, Palm Beach Gardens, FL (US)

(73) Assignees: TrackPoint Systems, LLC, Nashville, TN (US); Florida Power & Light Company, Juno Beach, FL (US)

( * ) Notice: Subject to any disclaimer, the term of this patent is extended or adjusted under 35 U.S.C. 154(b) by 192 days.

(21) Appl. No.: 13/554,833

(22) Filed: Jul. 20, 2012

(65) Prior Publication Data

US 2013/0181829 A1    Jul. 18, 2013

Related U.S. Application Data

(63) Continuation-in-part of application No. 13/152,061, filed on Jun. 2, 2011, which is a continuation of application No. 11/854,201, filed on Sep. 12, 2007, now Pat. No. 7,978,065.

(60) Provisional application No. 61/638,943, filed on Apr. 26, 2012, provisional application No. 61/509,816, filed on Jul. 20, 2011, provisional application No. 60/825,560, filed on Sep. 13, 2006.

(51) Int. Cl.
*G08B 1/08*    (2006.01)

(52) U.S. Cl.
USPC ............... 340/539.13; 340/539.1; 340/5.61; 73/290 R; 73/290 V

(58) Field of Classification Search
USPC ............ 340/539.13, 539.1, 539.22, 531, 612, 340/618, 5.61; 73/290 R, 290 V, 149, 291; 701/123, 213
See application file for complete search history.

(56) References Cited

U.S. PATENT DOCUMENTS

| | | |
|---|---|---|
| 5,303,585 A | 4/1994 | Lichte |
| 5,539,810 A | 7/1996 | Kennedy, III et al. |

(Continued)

FOREIGN PATENT DOCUMENTS

| | | |
|---|---|---|
| DE | 102004051148 A1 | 5/2006 |
| EP | 1717564 A1 | 11/2006 |

(Continued)

OTHER PUBLICATIONS

KIPO, International Search Report and Written Opinion in corresponding international application No. PCT/US2012/047717, completed Dec. 18, 2012.

(Continued)

*Primary Examiner* — Hung T. Nguyen
(74) *Attorney, Agent, or Firm* — Stites & Harbison PLLC; Jeffrey A. Haeberlin

(57) ABSTRACT

A system for measuring and reporting changing levels of liquids in a storage tank includes a sensing device having a fluid level sensor, an accelerometer, a wireless transceiver, and a microcontroller for detecting the volume of liquid in the storage tank in response to determining that the storage tank is not moving and sending an alert message if the volume of liquid in the storage tank has changed from a previous volume by a threshold amount. The system also includes a central tracking computer having a tracking database and being interfaced to the Internet, and a master control unit attached to the storage tank. The master control unit is for: receiving the alert message from the sensing device; obtaining the location of the storage tank; and communicating the alert message and the location of the storage tank to the central tracking computer for storage in the tracking database.

24 Claims, 14 Drawing Sheets

(56) References Cited

U.S. PATENT DOCUMENTS

| | | | |
|---|---|---|---|
| 5,544,225 A | 8/1996 | Kennedy, III et al. | |
| 5,880,364 A * | 3/1999 | Dam | 73/149 |
| 5,917,433 A | 6/1999 | Keillor et al. | |
| 5,996,407 A | 12/1999 | Hewitt | |
| 5,999,091 A | 12/1999 | Wortham | |
| 6,078,850 A | 6/2000 | Kane et al. | |
| 6,166,627 A | 12/2000 | Reeley | |
| 6,289,728 B1 * | 9/2001 | Wilkins | 73/149 |
| 6,484,035 B2 | 11/2002 | Allen, Jr. | |
| 6,484,088 B1 | 11/2002 | Reimer | |
| 6,644,115 B2 | 11/2003 | Cwik et al. | |
| 6,687,609 B2 | 2/2004 | Hsiao et al. | |
| 6,762,676 B2 | 7/2004 | Teowee et al. | |
| 6,847,305 B1 | 1/2005 | Buck | |
| 6,847,892 B2 | 1/2005 | Zhou et al. | |
| 6,907,371 B2 | 6/2005 | Klinger et al. | |
| 6,919,803 B2 | 7/2005 | Breed | |
| 6,965,816 B2 | 11/2005 | Walker | |
| 7,019,683 B2 | 3/2006 | Stevens et al. | |
| 7,098,669 B2 * | 8/2006 | Carter | 324/605 |
| 7,114,390 B2 * | 10/2006 | Lizon et al. | 73/290 V |
| 7,246,009 B2 | 7/2007 | Hamblen et al. | |
| 7,305,875 B1 * | 12/2007 | Pindus et al. | 73/149 |
| 7,978,065 B2 | 7/2011 | Schnitz et al. | |
| 2003/0069684 A1 | 4/2003 | Reimer | |
| 2003/0073406 A1 | 4/2003 | Benjamin et al. | |
| 2004/0183673 A1 | 9/2004 | Nageli | |
| 2004/0233041 A1 | 11/2004 | Bohman et al. | |
| 2005/0248444 A1 | 11/2005 | Joao | |
| 2005/0273218 A1 | 12/2005 | Breed et al. | |
| 2006/0017551 A1 | 1/2006 | Neher et al. | |
| 2006/0043090 A1 | 3/2006 | Ferrini | |
| 2006/0109106 A1 | 5/2006 | Braun | |
| 2006/0117820 A1 | 6/2006 | Lanigan et al. | |
| 2006/0181413 A1 | 8/2006 | Mostov | |
| 2006/0212194 A1 | 9/2006 | Breed | |
| 2006/0243347 A1 * | 11/2006 | Humphrey | 141/95 |
| 2007/0120665 A1 | 5/2007 | Martin et al. | |
| 2007/0149184 A1 | 6/2007 | Viegers et al. | |
| 2010/0089486 A1 | 4/2010 | Koeninger et al. | |
| 2010/0280734 A1 | 11/2010 | Brinton et al. | |
| 2011/0227727 A1 | 9/2011 | Schnitz et al. | |

FOREIGN PATENT DOCUMENTS

| | | |
|---|---|---|
| WO | 2001077625 A1 | 10/2001 |
| WO | 2004022434 A2 | 3/2004 |
| WO | 2006107752 A3 | 10/2006 |
| WO | 2007047359 | 4/2007 |
| WO | 2010091403 A2 | 8/2010 |

OTHER PUBLICATIONS

USPTO/ISA, International Search Report and Written Opinion for PCT/US07/78365, Mar. 14, 2008.

* cited by examiner

SYSTEM, METHOD, AND DEVICE FOR MEASURING AND REPORTING CHANGING LEVELS OF LIQUIDS IN STORAGE TANKS

CROSS-REFERENCE TO RELATED APPLICATIONS

This application claim the benefit of U.S. Provisional Application No. 61/638,943, filed Apr. 26, 2012, and U.S. Provisional Application No. 61/509,816, filed Jul. 20, 2011. This application is a continuation-in-part of prior U.S. application Ser. No. 13/152,061, filed Jun. 2, 2011, which is a continuation of U.S. application Ser. No. 11/854,201, filed Sep. 12, 2007 (now U.S. Pat. No. 7,978,065, issued Jul. 12, 2011), which claims priority to U.S. Provisional Application No. 60/825,560, filed Sep. 13, 2006. The entire disclosures of the above-identified applications are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to a system, method, and device for measuring and reporting changing levels of liquids in storage tanks 2. Background Art Many utility companies utilize 40 foot (12.19 meters) or 50 foot (15.24 meters) long liquid tanker trailers that are pulled behind semi-tractors to be moved between job sites or wherever fuel is needed. Such liquid tanker trailers typically have between three and five compartments for different types of fuel. The liquid tanker trailers are used, for example, at job sites where utility construction may proceed over the course of weeks or months.

Liquid tanker trailers are also used to transport and store liquids other than fuel.

Liquids may also be stored and moved in rail cars, skid tanks, and other non-permanent tanks.

BRIEF SUMMARY OF THE INVENTION

According to one aspect of the invention, a system for measuring and reporting changing levels of liquids in a storage tank includes a wireless autonomous fluid level sensing device, a central tracking computer, and a master control unit. The wireless autonomous fluid level sensing device includes a fluid level sensor for detecting a level of liquid in the storage tank, an accelerometer, a sensing device wireless transceiver, and a sensing device microcontroller in communication with the fluid level sensor, the accelerometer, and the sensing device wireless transceiver. The sensing device microcontroller executes instructions for: detecting, using the fluid level sensor, the level of liquid in the storage tank, in response to determining, using the accelerometer, that the storage tank is not moving; converting the level of liquid in the storage tank into a volume of liquid in the storage tank; and sending, using the sensing device wireless transceiver, an alert message if the volume of liquid in the storage tank has changed from a previous volume by a threshold amount. The central tracking computer has a tracking database and is interfaced to the Internet. The master control unit is attached to the storage tank, and includes a solar panel for converting light-energy into electrical power, a control unit battery for receiving and storing the electrical power from the solar panel, a GPS receiver module for receiving signals from a global positioning system and determining a location of the storage tank, a cellular data transceiver module for communicating with the central tracking computer via a cellular data network interfaced to the Internet, a local wireless network master transceiver module in wireless communication with the sensing device wireless transceiver, and a control unit microcontroller. The control unit microcontroller is for: controlling the local wireless network master transceiver module to receive the alert message from the wireless autonomous fluid level sensing device; controlling the GPS receiver module to obtain the location of the storage tank; and controlling the cellular data transceiver module to communicate, via the cellular data network and the Internet, the alert message and the location of the storage tank to the central tracking computer for storage in the tracking database.

In one implementation, determining, using the accelerometer, that the storage tank is not moving includes: taking a plurality of samples of each of an x-axis, a y-axis, and a z-axis of the accelerometer; determining a standard deviation of each of the plurality of samples of each of the x-axis, the y-axis, and the z-axis of the accelerometer; and determining that the storage tank is not moving when: the standard deviation of each of the plurality of samples of each of the x-axis, the y-axis, and the z-axis of the accelerometer is less than a predetermined constant value and the storage tank was previously determined to be still; or the storage tank was previously determined to be in motion but a percentage of the plurality of samples of each of the x-axis, the y-axis, and the z-axis of the accelerometer indicating motion over a plurality of sample cycles is less than a stillness threshold percentage value.

In another implementation, the sensing device microcontroller executes further instructions for sending, using the sensing device wireless transceiver, a liquid volume status report message with a current volume of liquid in the storage tank when the volume of liquid in the storage tank has not changed for a predetermined amount of time; and the control unit microcontroller is further for receiving, using the local wireless network master transceiver module, the liquid volume status report message and controlling the cellular data transceiver module to communicate, via the cellular data network and the Internet, the liquid volume status report message and the location of the storage tank to the central tracking computer for storage in the tracking database.

In yet another implementation, the wireless autonomous fluid level sensing device further comprises a sensing device battery for use as a power source, and a power management circuit in communication with the sensing device battery and the sensing device microcontroller, the power management circuit providing voltage level detection, regulation, and control, and power switching for autonomous operation of the wireless autonomous fluid level sensing device. The sensing device microcontroller executes further instructions for sending, using the sensing device wireless transceiver, a battery status report message indicating a status of the sensing device battery. The control unit microcontroller is further for receiving, using the local wireless network master transceiver module, the battery status report message and controlling the cellular data transceiver module to communicate, via the cellular data network and the Internet, the battery status report message to the central tracking computer for storage in the tracking database.

In yet another implementation, the control unit microcontroller is further for sending, using the local wireless network master transceiver module, a configuration message for configuring a variable parameter of the wireless autonomous fluid level sensing device. The sensing device microcontroller further executes instructions for configuring the variable parameter of the wireless autonomous fluid level sensing device in response to receiving, using the sensing device wireless transceiver, the configuration message.

According to another aspect of the invention, a method for measuring and reporting changing levels of liquids in a storage tank, includes: detecting, using a fluid level sensor of a wireless autonomous fluid level sensing device, a level of liquid in the storage tank, in response to determining, using an accelerometer, that the storage tank is not moving; converting the level of liquid in the storage tank into a volume of liquid in the storage tank; sending, using a sensing device wireless transceiver of the wireless autonomous fluid level sensing device, an alert message if the volume of liquid in the storage tank has changed from a previous volume by a threshold amount; receiving, using a local wireless network master transceiver module of a master control unit, the alert message from the sensing device wireless transceiver; obtaining, using a GPS receiver module of the master control unit, a location of the storage tank; and communicating, using a cellular data transceiver module of the master control unit, via a cellular data network and the Internet, the alert message and the location of the storage tank to a central tracking computer for storage in a tracking database.

According to yet another aspect of the invention, a wireless autonomous fluid level sensing device includes a fluid level sensor for detecting a level of liquid in a storage tank, an accelerometer, a sensing device wireless transceiver, and a sensing device microcontroller in communication with the fluid level sensor, the accelerometer, and the wireless transceiver. The sensing device microcontroller executes instructions for: detecting, using the fluid level sensor, the level of liquid in the storage tank, in response to determining, using the accelerometer, that the storage tank is not moving; converting the level of liquid in the storage tank into a volume of liquid in the storage tank; sending, using the sensing device wireless transceiver, an alert message when the volume of liquid in the storage tank has changed from a previous volume by a threshold amount.

In one implementation, the wireless autonomous fluid level sensing device further includes a magnetic detector in communication with the sensing device microcontroller. The sensing device microcontroller further executes instructions for initializing the fluid level sensor, the accelerometer, and the sensing device wireless transceiver in response to detecting, using the magnetic detector, that a magnet has been positioned in proximity to the magnetic detector.

In another implementation, the wireless autonomous fluid level sensing device further includes a temperature sensor in communication with the sensing device microcontroller. The temperature sensor is for detecting an ambient temperature value of the wireless autonomous fluid level sensing device. The sensing device microcontroller further executes instructions for adjusting the volume of liquid in the storage tank based on the ambient temperature value.

In still yet another implementation, the wireless autonomous fluid level sensing device further includes an intrinsically safe barrier device for providing intrinsically safe communications between the sensing device microcontroller and the fluid level sensor.

According to yet another aspect of the invention, a method of operating a wireless autonomous fluid level sensing device includes: detecting, using a fluid level sensor, a level of liquid in a storage tank, in response to determining, using an accelerometer, that the storage tank is not moving; converting, using a sensing device microcontroller, the level of liquid in the storage tank into a volume of liquid in the storage tank; sending, using a sensing device wireless transceiver, an alert message if the volume of liquid in the storage tank has changed from a previous volume by a threshold amount.

Other features and advantages of the invention will be set forth in or apparent from the detailed description of exemplary embodiments of the invention found below.

BRIEF DESCRIPTION OF THE DRAWINGS

FIG. 7-1 and FIG. 7-2, together, are a flow chart of an exemplary method of operation of a wireless autonomous fluid level sensing device, according to an aspect of the invention.

DETAILED DESCRIPTION OF EXEMPLARY EMBODIMENTS OF THE INVENTION

It is desired to know at all times where such liquid storage tanks are located, and how much liquid is in each compartment (sub-tank) of each tanker trailer so that, for example, a compartment can be re-supplied when it gets low.

Further, in an emergency situation, such as following a natural disaster (e.g., a hurricane), a utility company may utilize liquid tanker trailers for supplying fuel to restoration crews during a recovery operation. In such a case, it is also desirable to know where such liquid tanker trailers are located so that they can be topped off prior to the natural disaster and positioned at staging areas prior to or immediately following the natural disaster.

A system according to an exemplary embodiment of the invention includes: a wireless autonomous fluid level sensing device (a "WAFLS device"), a central tracking computer, and a master control unit (such as a Tr/IPS™ MCU (Master Control Unit) by TrackPoint Systems, LLC of Nashville, Tenn.). The system may also include backend interface/web application and infrastructure.

The WAFLS device is a single self-contained unit. The WAFLS device is preferably installed in a 2" NPT threaded bung in each storage tank to be monitored. The 2" NPT threaded bung may be pre-installed in each storage tank, or may be included in a replacement hatch that can be easily exchanged with an existing hatch present on each storage tank.

The WAFLS device measures the fluid volume in the tank at regular intervals, typically on the order of every minute or several minutes. If the WAFLS device detects a significant change in the fluid volume from the last alert, it issues a new alert and resets the baseline fluid level. If the WAFLS device goes for some significant period of time without detecting a change in the fluid volume, it issues a status report and resets its timer.

The WAFLS device issues an alert or status report by sending a wireless transmission to the master control unit. The master control unit then acquires a GPS fix and collects other system information, such as battery status, before sending the message through the cellular network to system servers.

The central tracking computer handles all acknowledgments, routing, addressing, and database management to ensure that the data connection with the master control unit is robust and secure. Once a message from master control unit is authenticated and acknowledged, the data is saved in a tracking database.

A custom Interface is used for providing the data collected in the tracking database. The Interface provides new data to the customer as requested for integration into the customer's internal business software and practices.

Figure 1:
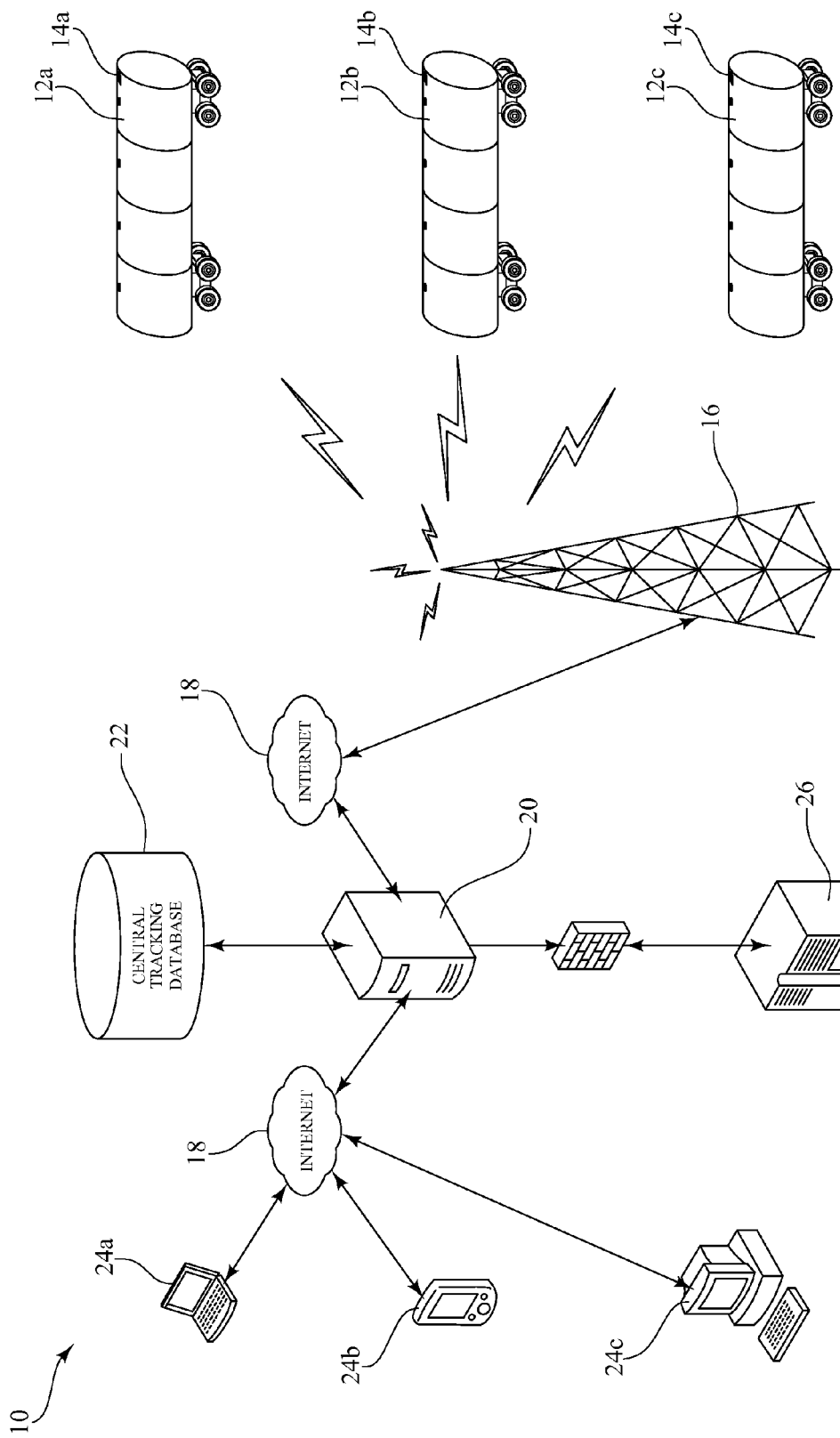
FIG. 1 is a block diagram of an exemplary system for measuring and reporting changing levels of liquids in storage tanks, according to an aspect of the invention.

FIG. 1 shows a system 10 according to an exemplary embodiment of the invention. The system 10 includes a plurality of liquid tanker trailers 12a-12c, master control units 14a-14c attached to respective liquid tanker trailers 12a-12c, a cellular data network 16 in communication with each master control unit 14a-14c, the Internet (or an equivalent global data network) 18 in communication with the cellular data network 16, a central tracking computer 20 in communication with the Internet 18, a tracking database 22 in communication with the central tracking computer 20, and various internet-access appliances 24a-24c in communication with the central tracking computer through the Internet 18. Also shown is a backup computer 26 for providing data backup and disaster recovery services for the central tracking computer 20 and the tracking database 22.

The master control units 14a-14c, which are described in more detail below, each include a microcontroller, a solar panel, a battery and a battery charging module, a cellular data transceiver module, a global positioning system ("GPS") receiver module, and a local wireless network master transceiver module, all in an integral, one-piece, sealed, watertight unit. The master control units 14a-14c receive data regarding the location of the respective liquid tanker trailers 12a-12c and the fluid levels in the respective tanks from the fluid sensors and the sensor electronics, and transmit the data to the tracking database 22 of the central tracking computer 20 via the cellular data network 16 and the Internet 18.

The cellular data network 16 is preferably a GSM cellular network or the like, which receives data transmissions from the cellular data transceiver module of the master control units 14a-14c and communicates the data transmissions onto the Internet 18. Additionally, the cellular data network 16 is utilized to transmit updates to software programs that reside in the master control units 14a-14c for operation and control of the master control units 14a-14c. Still further, requests for immediate data reporting from the master control units 14a-14c can be transmitted to the master control units 14a-14c through the cellular data network 16, rather than waiting for the master control units 14a-14c to receive the data and transmit the data to the tracking database 22.

The Internet 18 (or an equivalent global data network) receives the data transmissions from the cellular data network 16 and delivers them to the central tracking computer 20 in a manner that is known in the art.

The central tracking computer 20 receives the data transmissions from the Internet 18, saves the data to the tracking database 22, and also serves as a secure gateway for reports generated from the data in the tracking database 22 from the various internet-access appliances 24a-24c.

The various internet-access appliances 24a-24c, for example, are a laptop computer 24a, a personal digital assistant (PDA)-type device 24b, and a desktop computer 24c that access the central tracking computer 20 through the Internet 18 to obtain the reports generated from the data in the tracking database 22.

Figure 2:
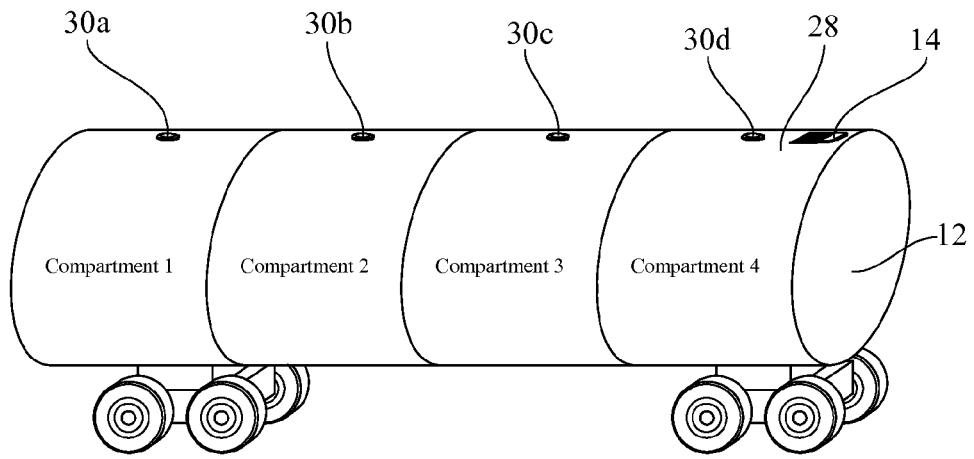
FIG. 2 is a functional illustration of a master control unit device attached to a liquid tanker trailer, and various wireless autonomous fluid level sensing devices, according to an aspect of the invention.

FIG. 2 shows an exemplary configuration of a master control unit 14 attached to the outside of the top 28 of a liquid tanker trailer 12. The liquid tanker trailer 12 is characterized in that the liquid tanker trailer 12 includes a plurality of compartments (storage tanks) for storing different types of liquid. Each compartment has a hatch located on the top 28 of the liquid tanker trailer 12. A WAFLS device 30a-30d is installed in a threaded opening in the hatch or elsewhere in each compartment (storage tank). The WAFLS device 30 is described in more detail below.

Figure 3:
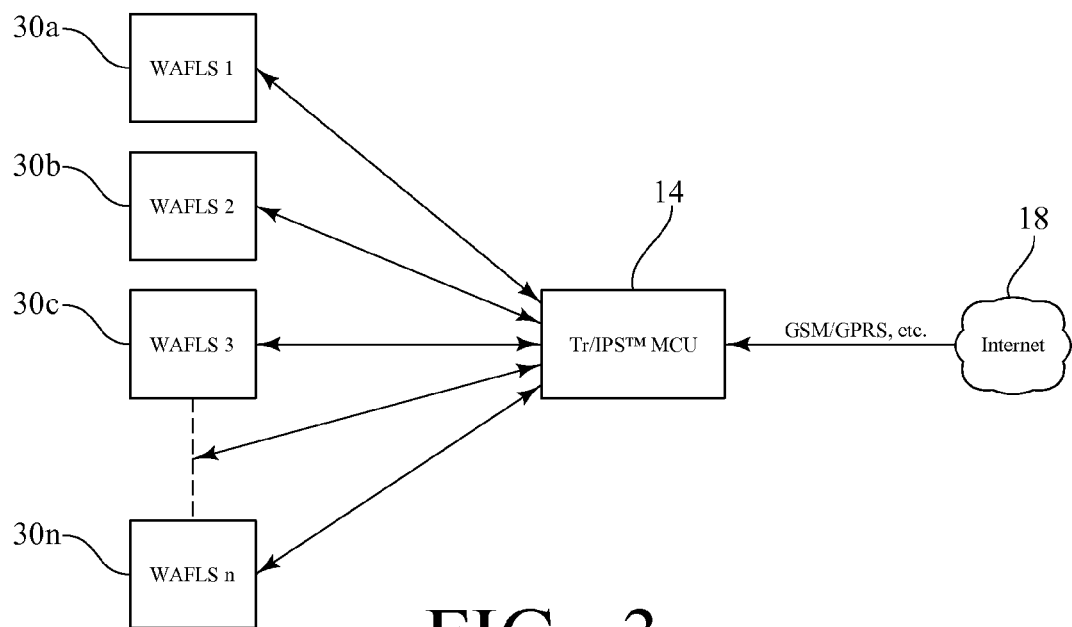
FIG. 3 is a functional block diagram of exemplary wireless autonomous fluid level sensing devices and a master control unit according to an aspect of the invention.

As shown in FIG. 3, the local wireless network master transceiver module of the master control unit 14 comprises the master node in a local wireless network with the wireless sensors. An exemplary wireless network uses the hardware specified by IEEE standard 802.15.4 coupled with a proprietary communication protocol. The local wireless network allows sensor data from the WAFLS devices 30a-30n in the network to be gathered by the master control unit 14 and transmitted to the Internet 18 using the cellular data transceiver module of the master control unit 14.

Particular WAFLS devices 30 are paired with a particular master control unit 14 to prevent crossing signals between multiple liquid tanker trailers 12 that may be in wireless sensor transmission proximity to each other (i.e. liquid tanker trailers "parked" next to each other). This may be done at the factory before the master control unit 14 and associated WAFLS devices 30 are delivered, or it may be done in the field if, for example, a wireless sensor is replaced. For instance, when a WAFLS device 30 first boots up it sends a message out requesting for master control unit 14 with which to pair. If a master control unit 14 is present, the master control unit 14 issues an encrypted challenge to the wireless sensor. The wireless sensor must decrypt the challenge, re-encrypt it with a second key, and then send it back to the master control unit 14. If that is successful, the master control unit 14 presents its network ID to the wireless sensor and they are then paired. From this point on, a master control unit 14 will only acknowledge messages from the paired wireless sensor.

Figure 4:
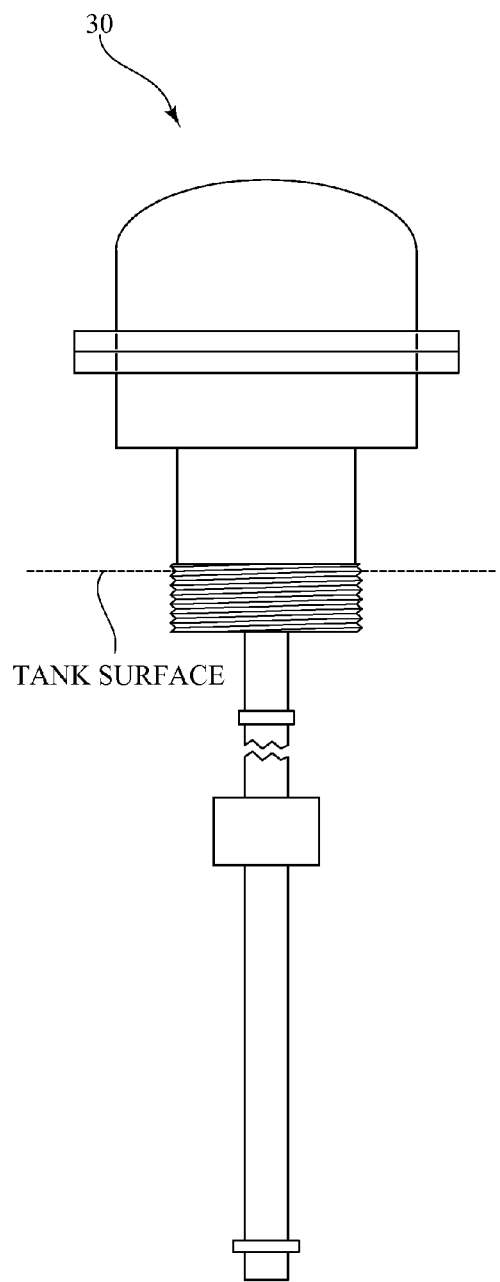
FIG. 4 and FIG. 5 are schematic views of an exemplary wireless autonomous fluid level sensing device using a continuous-level float sensor as a fluid level sensor, according to an aspect of the invention.
Figure 5:
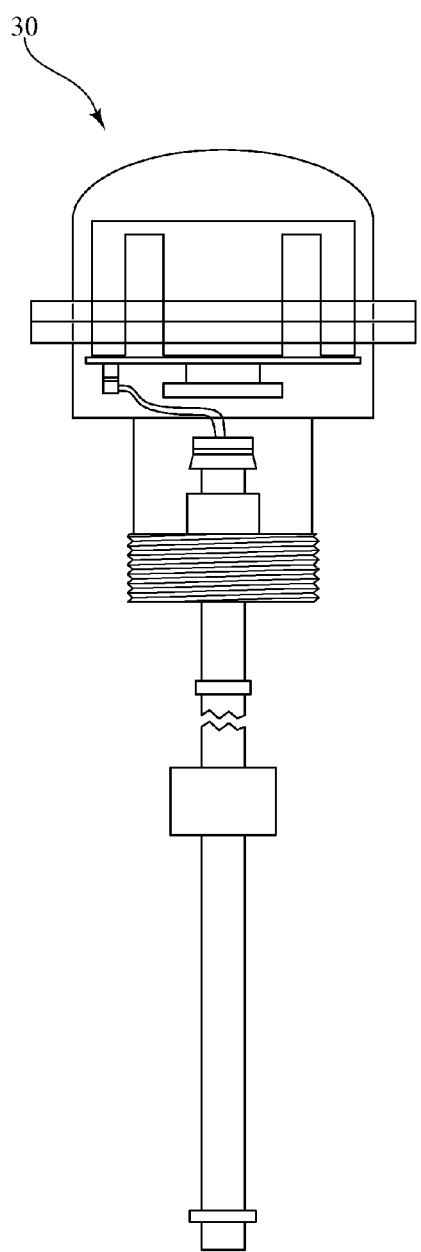
Figure 6:
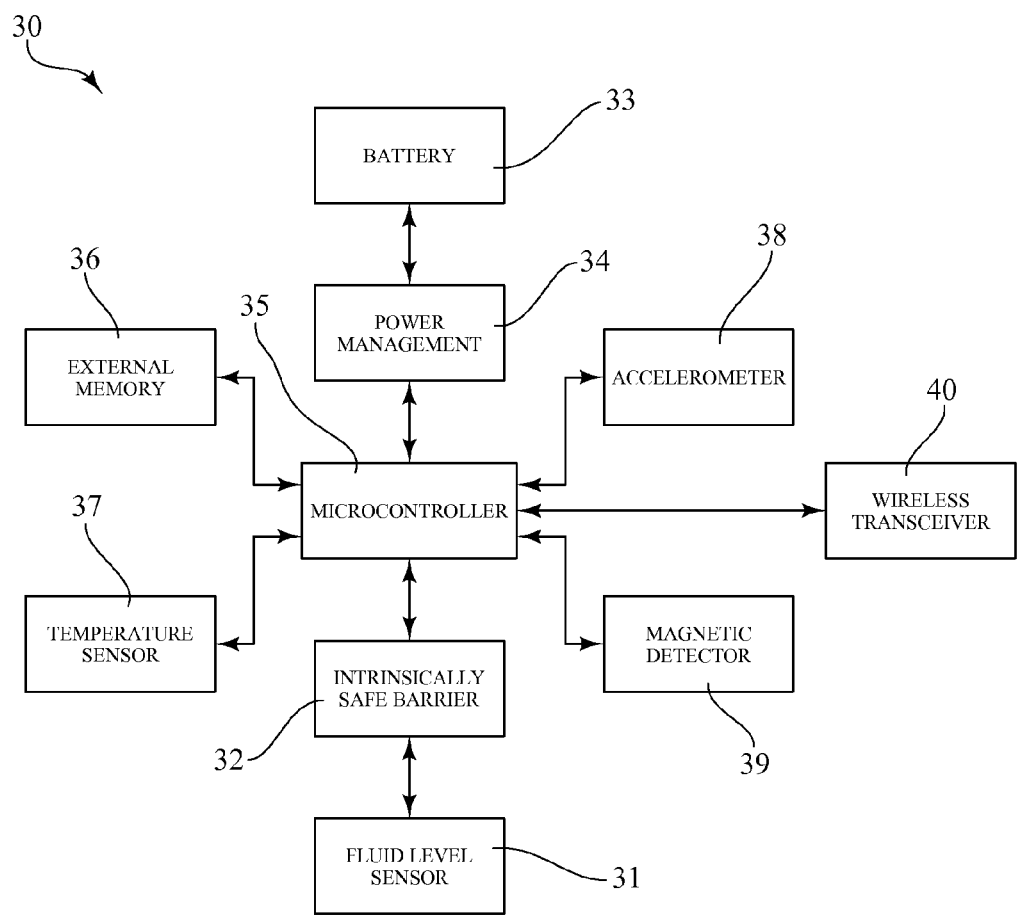
FIG. 6 is a functional block diagram of an exemplary wireless autonomous fluid level sensing device according to an aspect of the invention.
Figure 14:
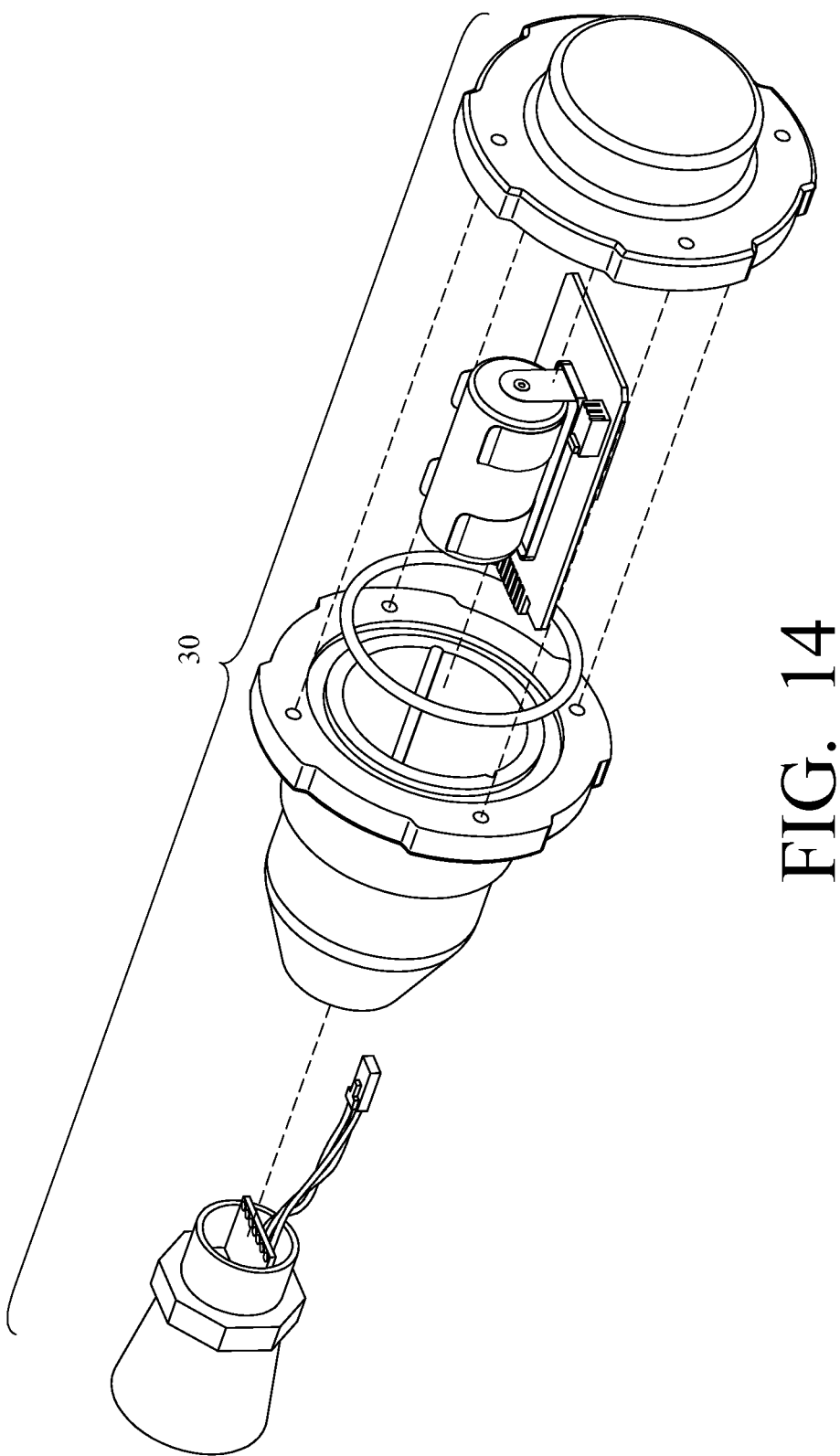
FIG. 14 is a schematic view of an exemplary wireless autonomous fluid level sensing device using a ultrasonic sensor as a fluid level sensor, according to an aspect of the invention.

FIG. 4, FIG. 5, and FIG. 14 are schematic views of an exemplary WAFLS device 30. The following is a description of the characteristics of the exemplary WAFLS device 30. FIG. 6 is a functional block diagram of the exemplary WAFLS device 30.

With respect to housing characteristics (FIG. 4, FIG. 5, FIG. 14), the material provides UV and temperature stability, chemical inertness, and compatibility with IS requirements. The material withstands all pertinent UV and temperature requirements, is non-reactive to any chemical that may be used, and is appropriate for the requirements of IS.

With respect to the size, the size is <=3" l/w/dx<=6" tall. The housing protects the sensor electronics in a weatherproof IP-67 rated enclosure while providing for a simple attachment to the sensor itself FIG. 4 and FIG. 5 show an example enclosure size and shape for a continuous-level float sensor.

FIG. 14 shows an example enclosure size and shape for an ultrasound sensor.

The housing mounts directly to a 2" NPT flange or directly to the sensor itself, if the sensor mounts directly to the flange. Other than the flange, there is no additional requirement for mounting brackets, screwing, drilling, tape, etc. to attach to the housing to the tank.

Turning to FIG. 6, the fluid level sensor 31 could be ultrasound, float-level, submersible pressure, or the like. Both practical and IS (Intrinsic Safety) requirements show that pressure sensing works well for diesel but may not be the ideal method for combustible fuels. A continuous level float indicator is more straightforward for IS certification testing due to the inherent safety and "zero-power" requirement, although the sensor length must be customized for each tank. The sensor modality balances several factors including the power requirements, suitability to IS requirements, cost, ease of implementation, and extensibility throughout the system.

With respect to sensing range, the exemplary WAFLS device 30 functions to measure a range from 2" to the tank depth minus 2", up to 72" maximum. Some sensing modalities may not be able to detect changes at the extreme bottom or top of the tank. For example, most pressure sensors have the sensing element in the center of the sensor and therefore cannot measure the bottom ½" to 1" of the tank. Continuous level (float) sensors typically have a shock spring at the top and bottom of the stick. Regardless of the selected modality, the WAFLS device 30 is able to detect fluid changes for all but the top 2" and bottom 2" of the tank.

With respect to the sensing resolution, the exemplary WAFLS device 30 functions to measure to less than ½". There are several variables that contribute to the sensing resolution, including the sensor itself and the electronics design. The exemplary sensor has between ½" and ¼" resolution.

With respect to mounting, the exemplary WAFLS device 30 mounts to a 2" NPT mount, or to an electronics housing. Because this is a mobile application, the mounting of the sensor is important to ensure stability and long life. Depending on the selected sensor, the sensor itself may mount directly into the 2" NPT bung, or the sensor may be held within the electronics housing.

With respect to power, the exemplary WAFLS device 30 requires less than 12 Vdc at less than 10 mA. The sensor power is a key consideration for both battery life and IS testing. Keeping the voltage level below 12V will make the IS testing more straightforward, while a current below 10 mA will contribute to the necessary battery life.

An IS barrier 32 provides required protection circuitry (e.g., protection diodes) for hazardous atmospheres.

With respect to a power source, the exemplary WAFLS device 30 utilizes a Primary Lithium, field-replaceable battery 33. The electronics are self-powered, i.e. have an integral battery 33. There is no reliable source for recharging the battery 33 or powering the sensor, so the battery 33 is solely responsible for providing power. Primary Lithium (LiSoCL2) batteries are ideal for their high energy density, low cost, and excellent temperature characteristics. The battery 33 is field-replaceable.

With respect to battery life, the battery life of the exemplary WAFLS device 30 is approximately 3 years. The battery life is estimated by considering parameters including the sleep current of the electronics, how often the device checks the fluid level, the sensor current, and how often the device sends a message to the MCU. A conservative estimate of 10 messages per day with a level check once per minute shall give a battery life of greater than 3 years.

Power management circuitry 34 of the exemplary WAFLS device 30 provides battery protection, voltage level regulation and control, and power switching, as necessary.

A microcontroller 35 of the exemplary WAFLS device 30 executes the main program and controls operation of the WAFLS device 30, as described in more detail below.

An external memory 36 of the exemplary WAFLS device 30 provides for storage of data, operating parameters, and other information.

A temperature sensor 37 provides ambient temperature information to the exemplary WAFLS device 30. As discussed below, the temperature sensor 37 can be used to adjust volume measurements to account for changes in fluid density resulting from temperature changes.

An accelerometer 38 provides motion information to the exemplary WAFLS device 30. As discussed below, the accelerometer 38 is used in a "anti-slosh" algorithm to determine if volume changes are due to fuel sloshing caused by motion.

A magnetic detector 39 functions as a power switch to activate or deactivate the exemplary WAFLS device 30. To preserve the integral, sealed characteristic of the WAFLS device 30, a Hall-effect sensor is included for functioning as an on/off switch. Prior to activation, only the Hall-effect sensor and the microcontroller 35 are running, and the microcontroller 35 is running in a super-low power mode. Upon activation with a magnet external to the WAFLS device 30, the microcontroller 35 senses the presence of the magnet via the Hall-effect sensor 70, and the microcontroller 35 turns the other components of the WAFLS device 30 "on" for operation.

A wireless transceiver 40 provides wireless communication between the exemplary WAFLS device 30 and the master control unit 14.

With respect to the measurement interval, the measurement interval of the exemplary WAFLS device 30 is 1 minute. The measurement interval is selected as a balance between quick response and notification to changes in fluid volume, and battery consumption relating to decreased battery life. Preliminary calculations show that there will be little overall affect on battery life if the device checks the volume once per minute as opposed to every five or 10 minutes. Therefore, the exemplary WAFLS device 30 evaluates the fluid volume once per minute.

With respect to an automatic reporting interval, the automatic reporting interval of the exemplary WAFLS device 30 is 12 hours. If the WAFLS device 30 does not detect a change in fluid volume for some period of time, it automatically sends a message with the current fluid volume to act as a "heartbeat" indicator of device operation. Again, this is a balance between having current, up-to-date information and battery consumption. The 12 hour interval (2 times per day) could be increased to every 6 hours while staying above the battery life requirements.

With respect to an alert reporting delta, the alert reporting delta of the exemplary WAFLS device 30 is less than 450 gallon (1703 liters) change. The sensor reports the fluid level in inches (or fractional inches), but due to the elliptical-cylindrical shape of the tank, 1" at the bottom or top of the tank is far less volume of fluid than 1" in the center of the tank. For example, for a certain liquid tanker trailer, 1" at the bottom of the tank is 35 gallons (132.5 liters) of fluid whereas 1" at the center of the tank is 140 gallons (530 liters). The exemplary WAFLS device 30 sends alerts based on volume changes rather than level changes, so that excessive alerts are not sent for small changes near the extremes of the tanks, as described in the following paragraphs.

Each WAFLS device 30 is programmed, either at the factory, in the field, or over-the-air, with the length, width, and height of the tank in which it is installed. The WAFLS device 30 then uses these parameters to calculate the maximum volume of fluid that could be contained in that tank.

Each WAFLS device 30 is also programmed, either at the factory, in the field, or over-the-air, with the threshold percentage of change in fluid volume that will trigger an alert message. The WAFLS device 30 uses the threshold percentage of change and the maximum volume to determine what the threshold volume of change is for that tank.

With each fluid level measurement, the measured fluid level is mathematically converted to a fluid volume. That fluid volume is then compared to the fluid volume of the last transmitted message; if the difference is greater than the threshold volume of change, then an alert message is sent.

Figures 1, 7:
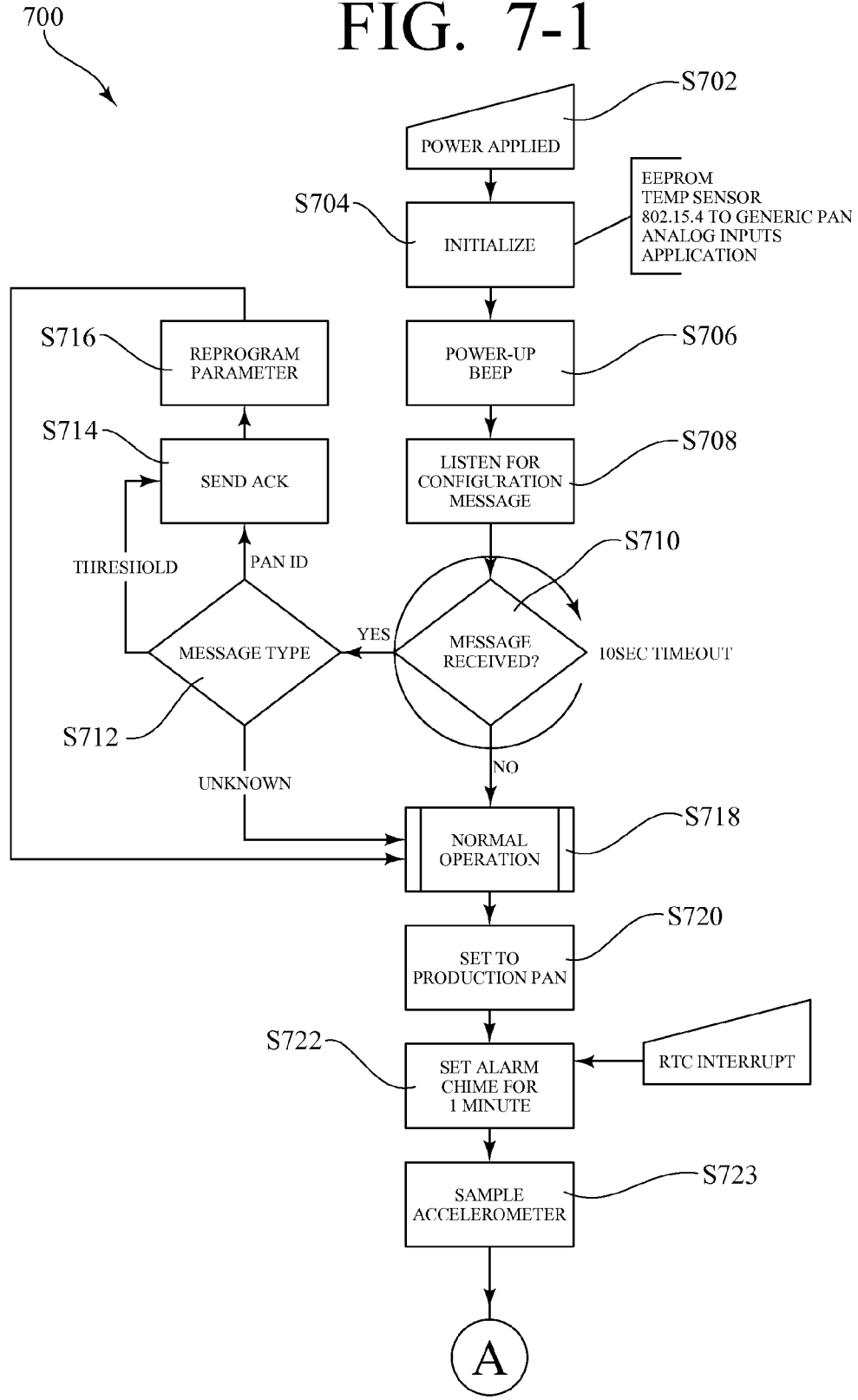
Figures 2, 7:
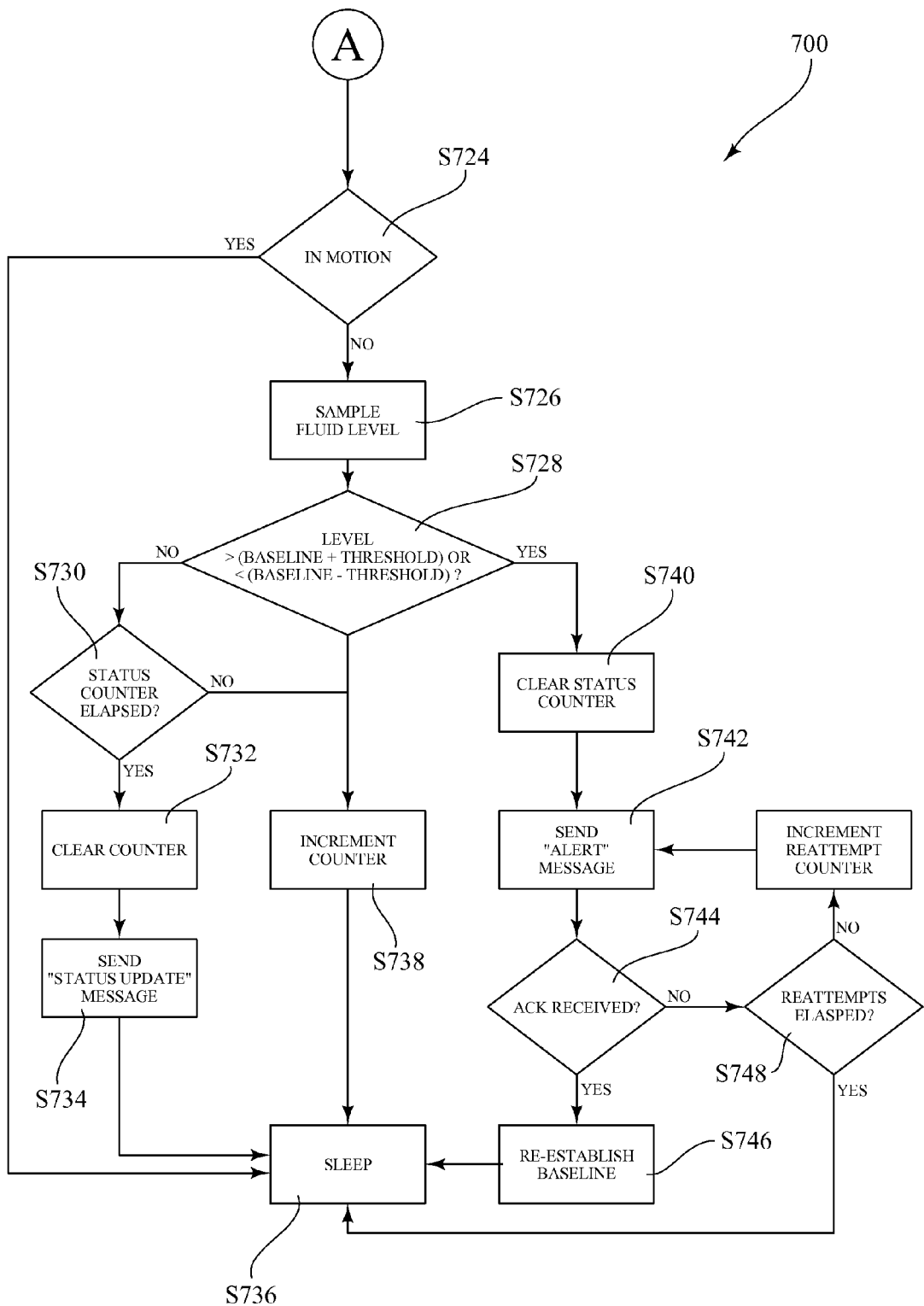

FIG. 7 is a flow chart of an exemplary method 700 of operation of the exemplary WAFLS device 30, executed by the microcontroller 35 thereof. In step S702, power is applied, preferably via a signal from the magnetic detector 39 (FIG. 6) that a magnet has been positioned external to the WAFLS device 30. In step S704, the components of the WAFLS device 30 are initialized, as indicated. Step S706 is a power-up beep.

Step S708 is listening, via the wireless transceiver 40 (FIG. 6) for a configuration message (i.e., a configuration message for configuring a variable parameter of the WAFLS device). For example, the configuration message could contain information on what the threshold is for determining that there has been a change of fluid volume, how often to check for a change in fluid volume, or how often to report if there has not been a change in fluid volume. As indicated by the determination of step S710, if a message is received within a set time (e.g., 10 seconds), then the message type is determined (S712) and, if appropriate, an acknowledgement is sent (S714), the appropriate parameters are programmed (S716), and the components are (re)initialized (S704). If a message is not received within the set time, or if the message type is unknown, then normal operation is initiated in step S718.

Step S720 is "set to production PAN." The local wireless network between the master control unit 14 (FIG. 2) and the WAFLS device 30 utilizes a Personal Area Network ID (PAN ID) that is unique per master control unit 14. Only devices on that PAN can communicate with each other. Thus, as mentioned above, particular WAFLS devices 30 are paired with a particular master control unit 14 to prevent crossing signals between multiple liquid tanker trailers 12 that may be in wireless sensor transmission proximity to each other (i.e. liquid tanker trailers "parked" next to each other). When the WAFLS device 30 powers up, it goes to a generic PAN to listen for a configuration message. This is primarily a manufacturing process, so the WAFLS device 30 can be configured before being shipped to a customer. Then the WAFLS device 30 reconfigures itself for a specific production PAN for the master control unit 14 on the trailer on which it is installed, and then enters normal operation.

Step S722 is "set alarm chime for 1 minute." This means the WAFLS device 30 sleeps for one minute at a time to save power, accomplished by setting a hardware alarm in a RTC module to "wake up" and execute instructions after one minute elapses.

Step S723 is sampling the accelerometer 38 (FIG. 6).

Step S724 is determining, as described below, if the liquid tank (e.g., the liquid tanker trailer 12) is moving. If the liquid tanker trailer 12 is moving, then no further action is taken until the movement stops.

Figure 15:
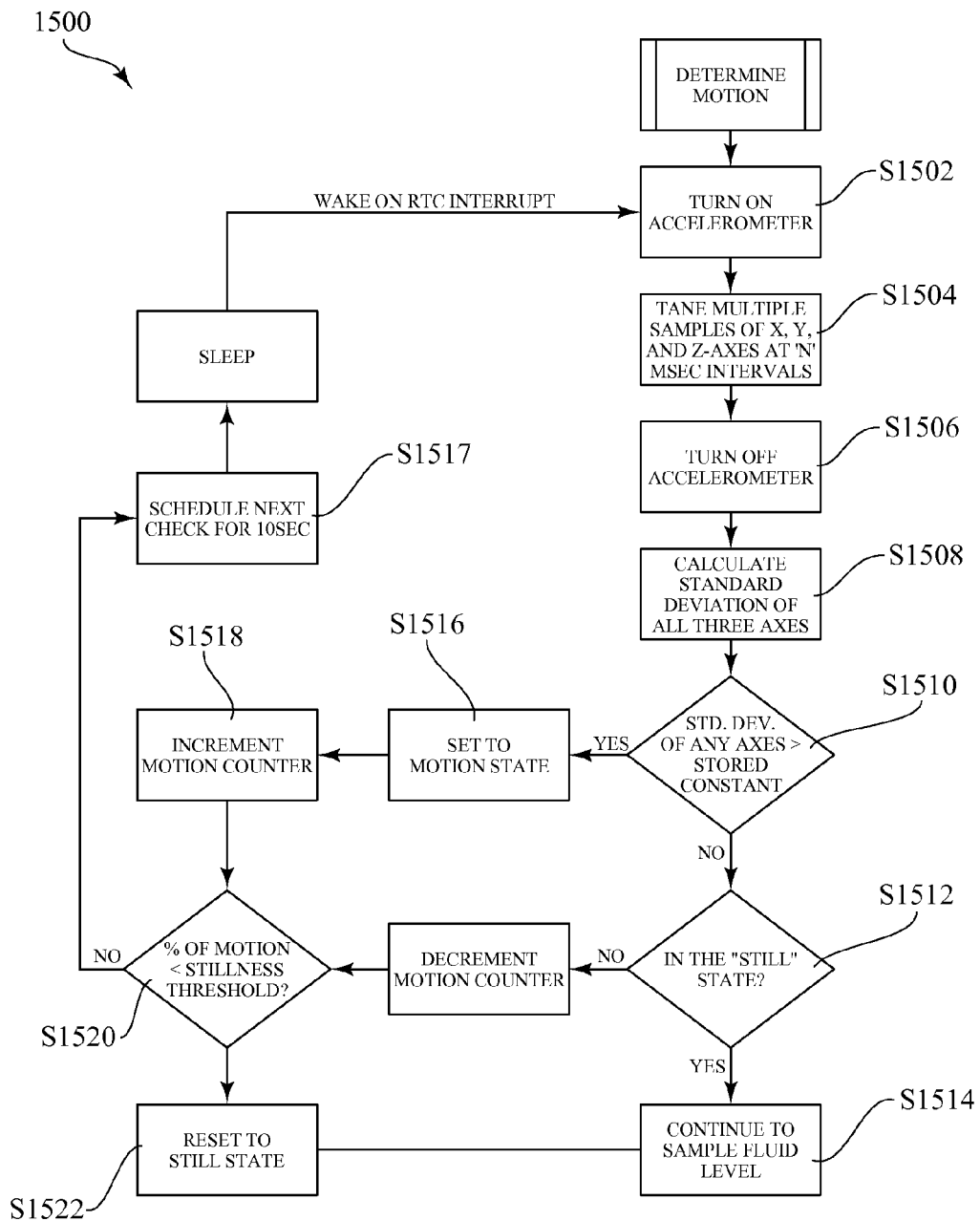
FIG. 15 is a flow chart of an exemplary method of determining whether a liquid storage tank is moving or not.

FIG. 15 is a flow chart of an exemplary method 1500 of determining if the liquid tank (e.g., the liquid tanker trailer 12) is moving. The accelerometer 38 is used to determine if the device is currently in motion, or currently still. This is done by turning on the accelerometer 38 prior to taking a fluid level measurement (step S1502), taking several samples of each of the x-, y-, and z-axes at known intervals (step S1504), and turning off the accelerometer 38 (step S1506). A typical interval would be 10 ms between measurements, to accurately capture varying vibration levels within the transportation spectrum.

Then, the standard deviation of each axis is calculated to measure the variance of each of those samples (step S1508). The standard deviation of each axis is then compared to a stored constant value to determine if the samples are varied enough that they represent motion, or if they are grouped tightly enough that they represent stillness (step S1510). When the standard deviation of the samples is calculated, a large number indicates a large amount of vibration occurred, and therefore the device is in motion. A small number indicates very little vibration occurred, and therefore the WAFLS device 30 is still.

If the device has been determined to be still (S1512), and has previously been determined to be still, it will then sample the fluid level and continue on with normal operation (step S1514).

However, if the device has been determine to be in motion (step S1516) but has previously been determined to be still, then the device does not sample the fluid level immediately. Instead, it starts to schedule repeated cycles of determining the motion state at a more frequent rate (e.g., every 10 seconds as opposed to every 60 seconds) than in the still state (step S1517). With each cycle, the motion state is recorded and an array of the last 'n' measurements (e.g., 'n'=30 or 5 minutes of measurements) is kept (step S1518). With each cycle, the percent of stored "still" measurements in the array are calculated (step S1520). When that percentage of stored "still" measurements exceeds a predetermined amount (e.g., 75%), the device then has determined that the overall state of motion has ended and the WAFLS device 30 can safely return to a state of stillness (step S1522). Normal operation then resumes, including level/volume measurements.

For example, using the exemplary values described above, 10 samples of each axis at 10 millisecond intervals are taken. A threshold of '15' mg (where g means g-force) is used to determine if it is still or in motion. '15' has been empirically determined to be a good value for this application. A 10-bit A/D converter (1024 states) is utilized, and the standard deviation is calculated from the raw A/D converter states. Thus, '15' is a measure of variability of the accelerometer measurements, and, therefore, is related to g-force. The exemplary accelerometer 38 is has a range of +2 g to −2 g, so that means each A/D converter state is 4 g/1024 or about 4 mg. So '15' would be about 60 mg. Thus, a standard deviation of about 60 mg between the samples indicates that the WAFLS device 30 is in motion and, therefore, is not still.

When the motion state is detected, the motion checks are rescheduled for every 10 seconds rather than once per minute. A sliding array of 30 measurements (which represents 5 minutes of measurements at 10 second intervals) are kept. There is no "check" to see if the device has been "still enough" until all 30 slots are filled up. Once that occurs, a check is performed with each new cycle to see if at least 75% of the slots in the array are considered to be still. If so, the state is transitioned out of the motion state back to the still state.

Returning now to FIG. 7, if or when the liquid tanker trailer 12 is not moving, then a sample fluid level is taken (S726).

It is then determined if the volume has changed from a baseline volume by a threshold amount (S728). The baseline volume is the fluid volume the last time that the WAFLS device 30 sent a message. A status counter increments once/minute. If the volume has not changed by the threshold amount, it is determined if the status counter has elapsed (S730). If the status counter has elapsed, then the counter is cleared (S732) and a "status update" message is sent (S734). Step S736 is sleeping for the remainder of the measurement interval before returning to the determining if the liquid tanker trailer 12 is moving (S724) and sampling the fluid volume (726). If the status counter has not elapsed, then the counter is incremented (S738) and the sleeping step (S736) begins. If the volume has changed by the threshold amount, the status counter is cleared (S740), and an "alert" message is sent (S742). Then, it is determined if an acknowledgement is received (S744). If an acknowledgement is received, then the baseline is re-established (S746), and the sleeping step (S736) begins. If an acknowledgement message is not received, then it is determined if a number of reattempts has elapsed (S748). If the reattempts have not elapsed, then the reattempt counter is incremented (S750) and the "alert" message is re-sent (S744). If the reattempts have elapsed, then the sleeping step (S736) begins.

Additionally, it is well-known that fluid density is affected by temperature. Within a contained space such as a sealed fuel tank, an increase in temperature is reflected by an increase in volume of the fluid in the tank. This can cause error in the fluid volume measurements if not adjusted. The integral temperature sensor 37 (FIG. 6) of the WAFLS device 30 measures the ambient temperature inside the fuel tank. The temperature information is used to adjust the volume measurements with each measurement to account for volume changes which are the result of temperature changes as opposed to fluid added to or removed from the tank.

For example, using the density of the liquid and the thermal coefficient of expansion of the liquid in the storage tank, the percent increase of the volume of the liquid is calculated relative to a nominal measurement (typically 25 C). The volume of liquid in the storage tank is determined using the normal methods. Then the temperature is used to determine the % increase (or decrease) in the volume of liquid at that temperature. The volume of liquid in the storage tank is then corrected by simply calculating out the increased (or decreased) amount of volume caused by the increased (or decreased) temperature.

Figure 8:
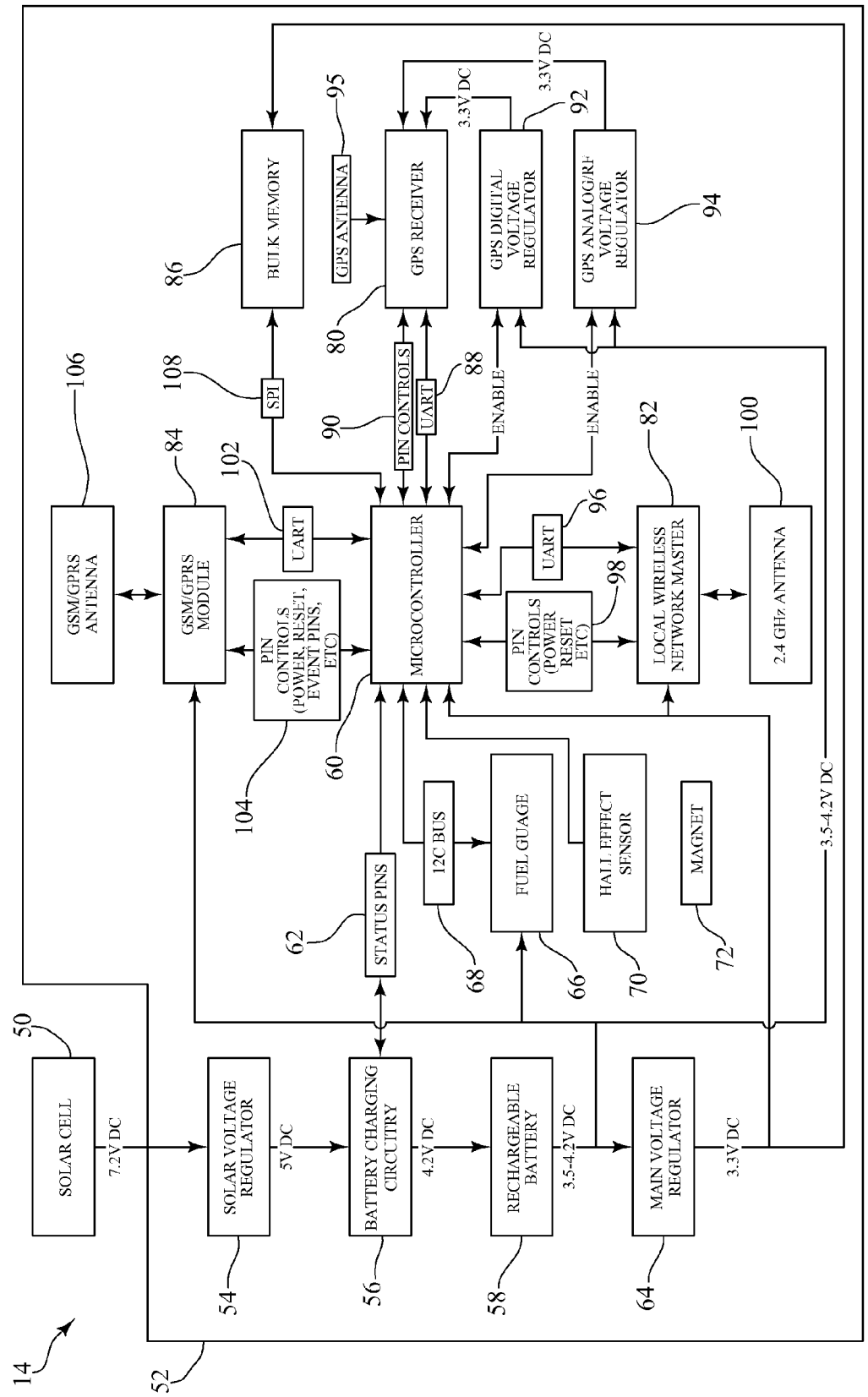
FIG. 8 is a functional block diagram of an exemplary master control unit according to an aspect of the invention.
Figure 9:
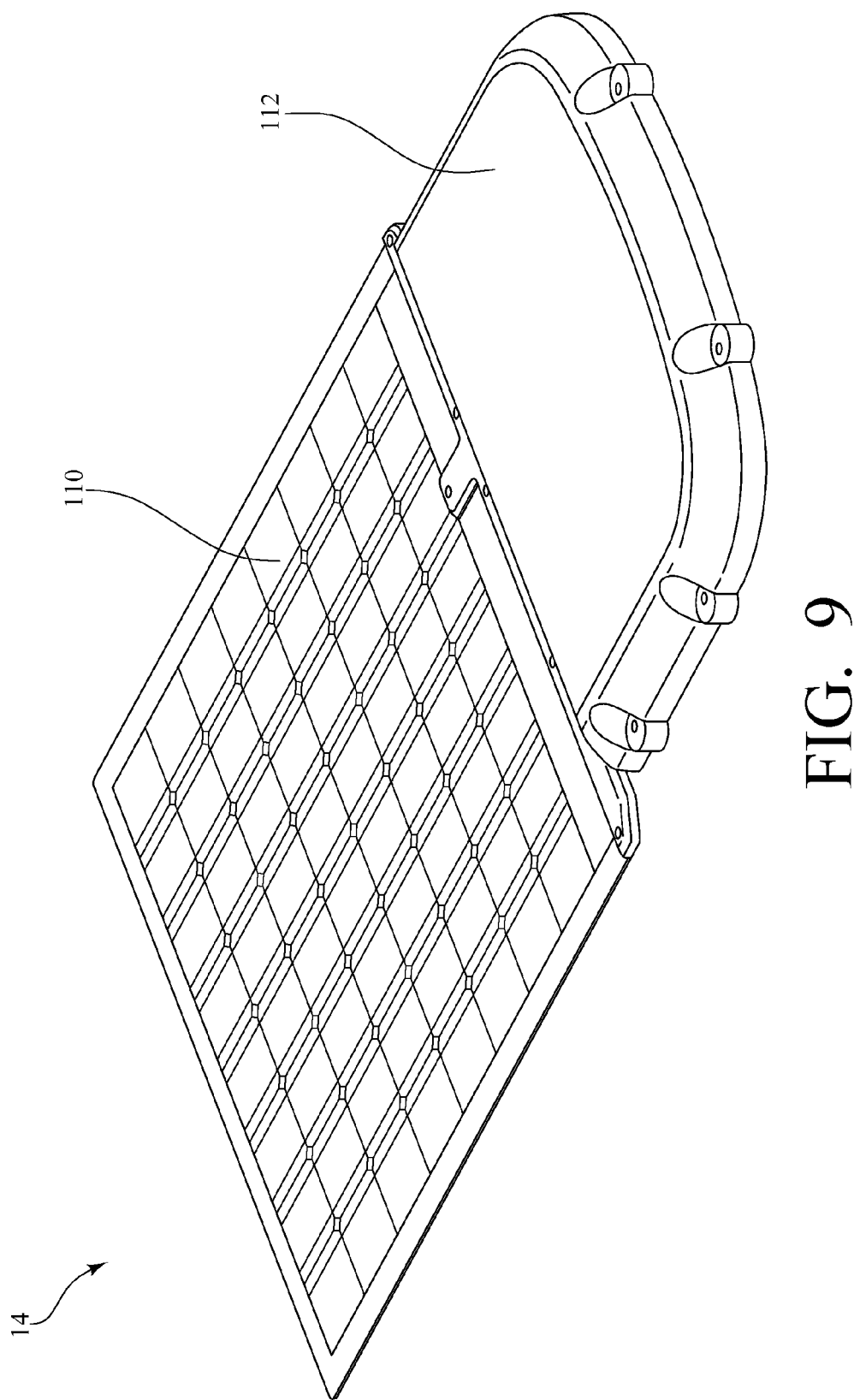
FIG. 9 is a perspective view of an exemplary master control unit according to an aspect of the invention.
Figure 10:
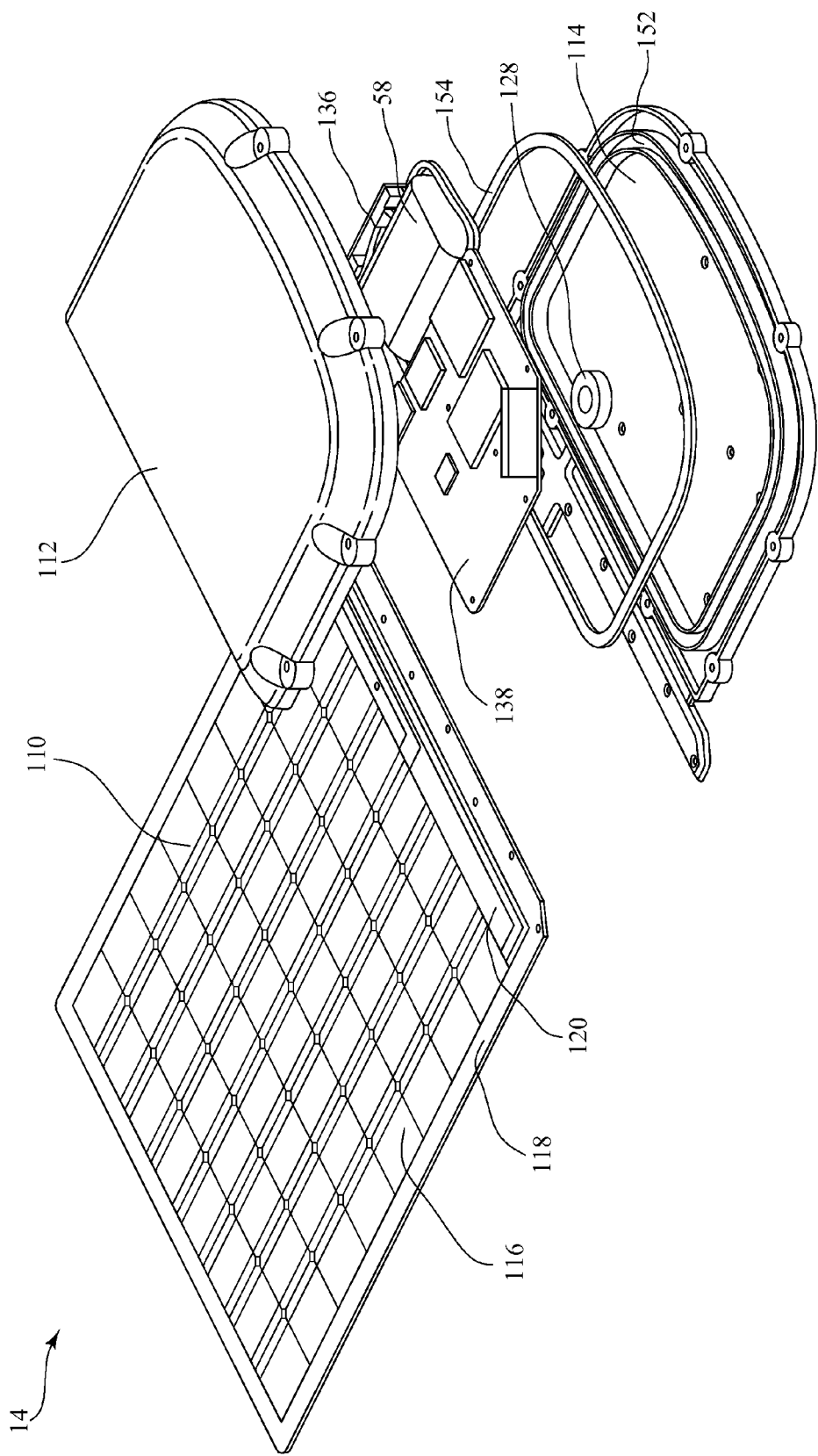
FIG. 10 is an exploded perspective view of the exemplary master control unit of FIG. 4.

FIG. 8 is a block diagram of an exemplary master control unit 14 including solar cells 50 and an electronics module 52, which are integrated into a one-piece unit as described below. The solar cells 50 converts light energy, such as from the sun, into power for operation of the electronics module 52.

Preferably, the solar cells 50 provides electrical power to a solar voltage regulator 54, which steps down the voltage for a pulse-charge battery charging circuit 56. The pulse-charge battery charging circuit 56 charges a battery 58. The solar cells 50 are inherently a current-limited source, because the instantaneous current output of the solar cells 50 differs greatly depending on cloud cover, angle of the sun, etc. A traditional linear charger does not work well because when the current output of the solar cells 50 decreases (for example if a cloud obscures the sun), then the linear charger will "drop out," meaning it will stop the charging thinking the power source was removed. As a result the charging process would continually start and stop, and never finish properly. The pulse-charge battery charging circuit 56 is able to compensate for varying instantaneous current levels because the pulse charge circuit delivers the charge current in "packets" rather than linearly. Thus, if the source becomes current-limited, the pulse-charge battery charging circuit 56 will store up enough power until it can deliver a packet of current. The result is that even in cloudy weather the pulse-charge battery charging circuit 56 charges without dropping out, even though it is less efficient than in sunny weather. The pulse-charge battery charging circuit 56 communicates its charging status to a microcontroller 60 using status pins 62, and the microcontroller 60 controls the pulse-charge battery charging circuit 56 via the status pins 62.

The battery 58 preferably utilizes lithium-ion chemistry, due to the high charge density and high number of recharge cycles of lithium-ion batteries. However, it is not intended that the claims be limited to any particular rechargeable battery chemistry. The battery 58 provides power, either directly or through a main voltage regulator 64, to the components of the electronics module 52 described below.

A fuel gauge circuit 66 is powered by and monitors the power level of the battery 58. The fuel gauge circuit 66 communicates the power level of the battery 58 to the microcontroller 60 using an I2C bus 68.

The microcontroller 60 uses the information about the power level of the battery 58 and the charging status of the pulse-charge battery charging circuit 56 to manage power usage if the master control unit 14 is shielded from the sun for an extended period, as described in more detail below.

Additionally, to preserve the integral, sealed characteristic of the master control unit 14, a Hall-effect sensor 70 is included for functioning as an on/off switch. As will be discussed below, a housing of the master control unit 14 is provided with a recess for receiving a magnet 72. When placed in the recess, the magnet 72 is aligned with the Hall-effect sensor 70, which is located on the inside of the housing. When the magnet 72 is not in the recess, only the Hall-effect sensor and the microcontroller 60 are running, and the microcontroller is running is a super-low power mode. When the magnet 72 is placed in the recess, typically at installation of the master control unit 14 at a customer site, the microcontroller 60 senses the presence of the magnet 72 via the Hall-effect sensor 70, and the microcontroller 60 turns the other components of the electronics module 52 "on" for operation.

The electronics module 52 includes a GPS receiver module 80, a local wireless network master transceiver module 82, a cellular data transceiver module 84, and a bulk memory module 86. The microcontroller 60 uses proprietary firmware to control all functions of the electronics module.

The GPS receiver module 80 is interfaced to the microcontroller 60 over a GPS serial Universal Asynchronous Receiver/Transmitter (UART) 88 and through GPS pin controls 90. Additionally, power for a digital portion of the GPS receiver module 80 is supplied by a GPS digital voltage regulator 92, and power for an analog/RF portion of the GPS receiver module 80 is supplied by a GPS analog/RF voltage regulator 94. The GPS digital voltage regulator 92 and the GPS analog/RF voltage regulator 94 are supplied directly by the rechargeable battery 58, and enabled or disabled by the microcontroller 60, thereby providing and removing power as desired. The microcontroller 60 also communicates with the GPS receiver module 80 over the GPS UART 88 for instructing the GPS receiver module 80 to enter different modes, such as low-power or active modes, or to configure the GPS receiver module 80 to output messages in a desired format. The GPS receiver module 80 collects radiofrequency Global Positioning System data from a passive GPS antenna 95, and converts the data to a digital format for transmission to the microcontroller 60 over the GPS UART 88. An active GPS antenna could be used, but because the GPS receiver module 80 and the passive GPS antenna 95 are in the same package and physically close to each other, the passive antenna 95 is adequate, providing lower cost and power benefits.

The local wireless network master transceiver module 82 is interfaced to the microcontroller 60 over a local wireless network master UART 96 and through local wireless network master pin controls 98. The local wireless network master transceiver module 82 is powered by the main voltage regulator 64. The local wireless network master transceiver module 82 communicates wirelessly through a 2.4 GHz antenna 100 to the WAFLS devices 30, such as discussed above with respect to FIG. 2 and FIG. 3. The 2.4 GHz antenna 100 is soldered onto a circuit board with the local wireless network master transceiver module 82. Alternately, the 2.4 GHz antenna 100 can be attached to the circuit board through several methods, including being printed onto the circuit board. The microcontroller 60 and the local wireless network master transceiver module 82 communicate data to and from the wireless sensors via the local wireless network master UART 96. Additionally, the microcontroller 60 communicates commands and instructions via the local wireless network master UART 96 that change the mode or function of the local wireless network master transceiver module 82. The microcontroller 60 controls power and reset functions of the via the local wireless network master transceiver module 82 via the local wireless network master pin controls 98.

Advantageously, the local wireless network master UART 96 and the GPS UART 88 may be the same UART channel, with the microcontroller 60 controlling a dual SPDT IC switch (one switch for RX and the other switch for TX) to switch the destination as necessary.

The cellular data transceiver module 84 is interfaced to the microcontroller 60 over a cellular data transceiver UART 102 and through cellular data transceiver pin controls 104. The cellular data transceiver module 84 is powered directly by the rechargeable battery 58. The microcontroller controls the cellular data transceiver module 84 by issuing and receiving data over the cellular data transceiver UART 102, and by using the cellular data transceiver pin controls 104 to control power and reset functions. The cellular data transceiver module 84 is used to transmit data out of the master control unit 14 to an end user over the Internet 18, and to receive data from an end user over the Internet 18. The cellular data transceiver module 84 takes digital data from the microcontroller 60 and converts it to radiofrequency waves, which are transmitted using an integral GSM/GPRS antenna 106. Similarly, radiofrequency waves captured by the GSM/GPRS antenna 106 are transmitted to the cellular data transceiver module 84, which converts the waves to digital data for communication to the microcontroller 60.

The bulk memory module 86 is interfaced to the microcontroller 60 over a serial peripheral interface (SPI) 108, and is powered by the main voltage regulator 64. The bulk memory module 86 is used to store GPS or other operational data, and to store microcontroller program memory for bootloading applications.

Figure 11:
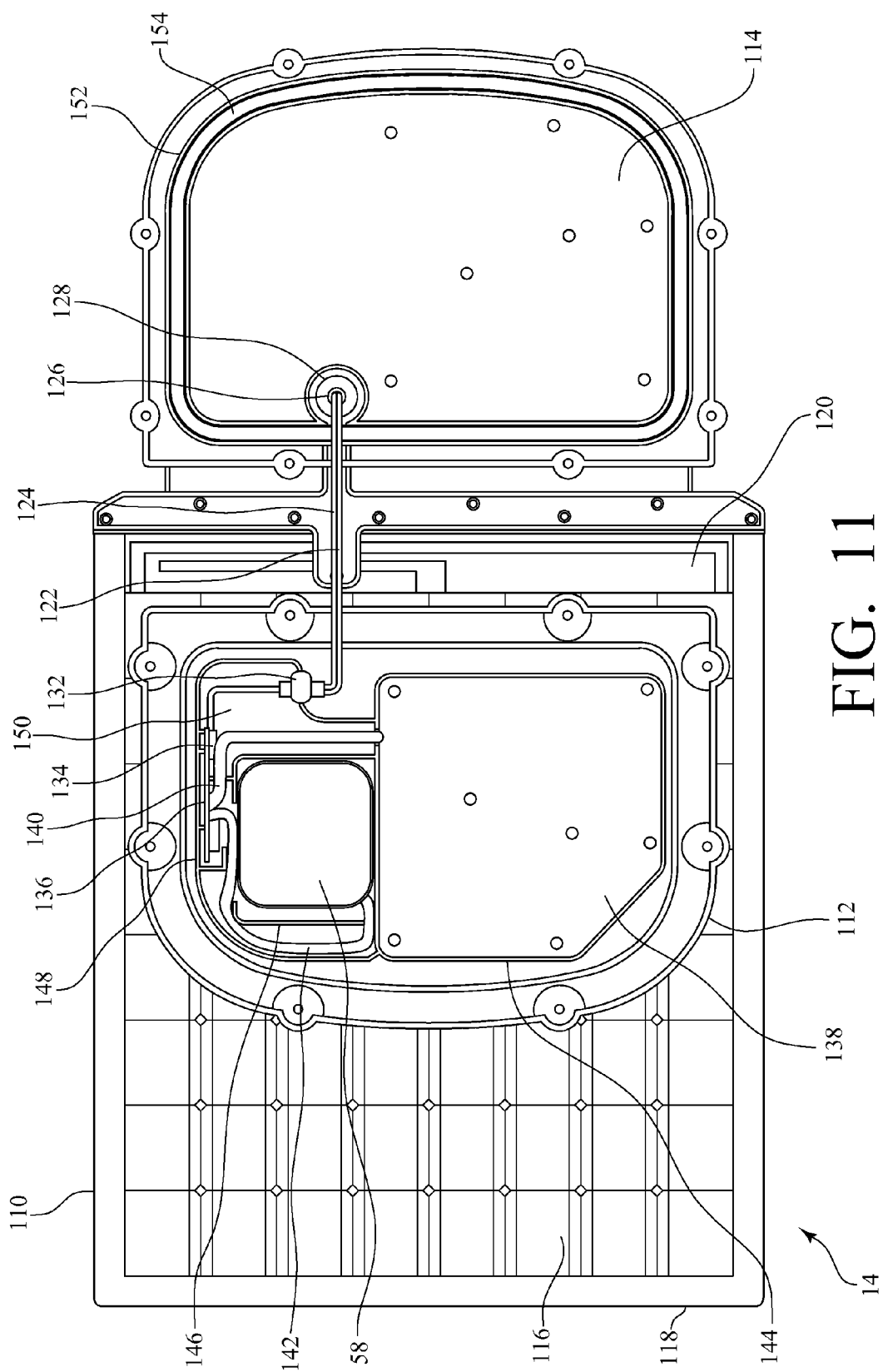
FIG. 11 is top view of the exemplary master control unit of FIG. 9, wherein an electronics housing is folded back over a solar panel, exposing an underside of the electronics housing and a baseplate member.
Figure 12:
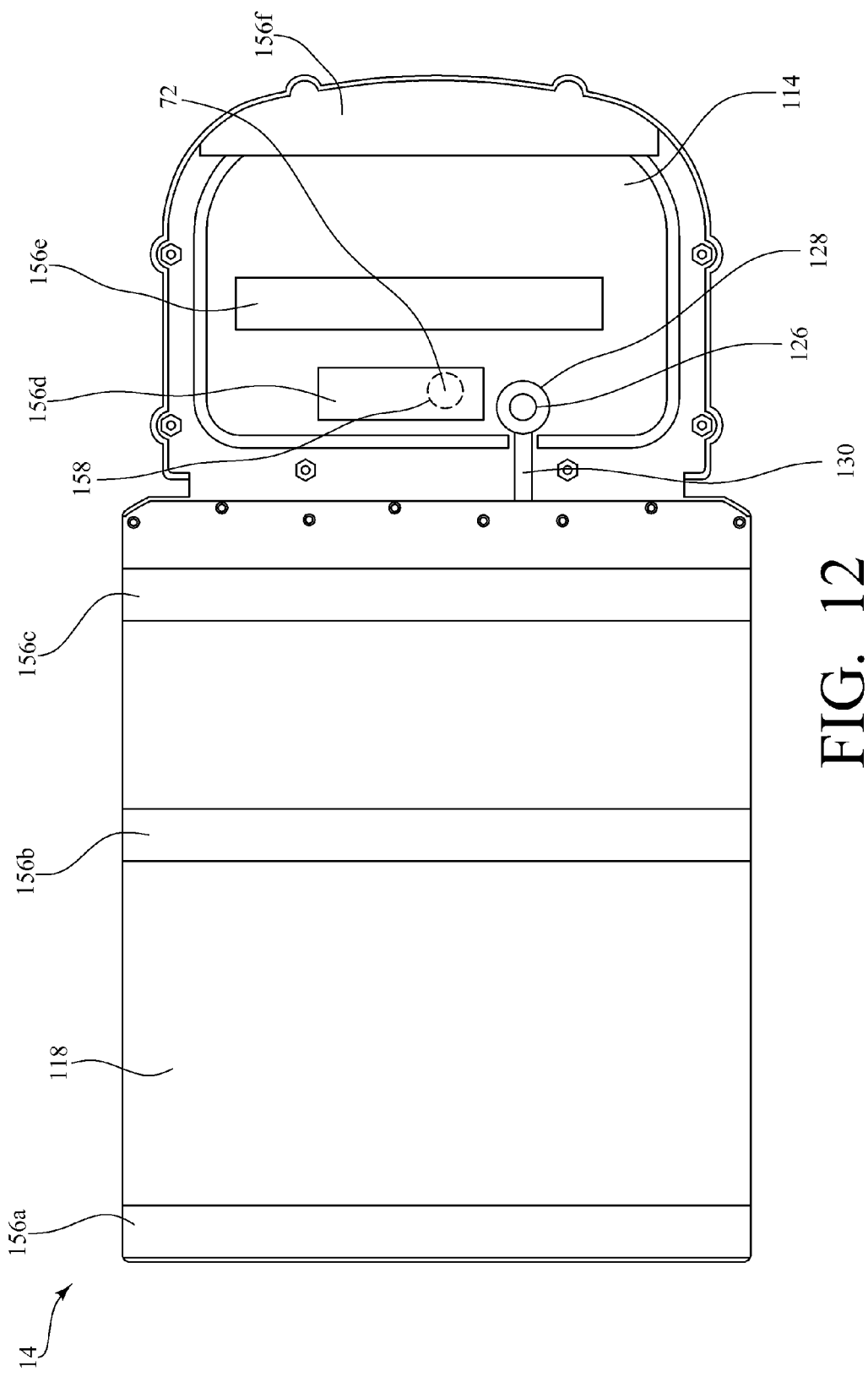
FIG. 12 is a bottom view of the exemplary master control unit of FIG. 9.
Figure 13:
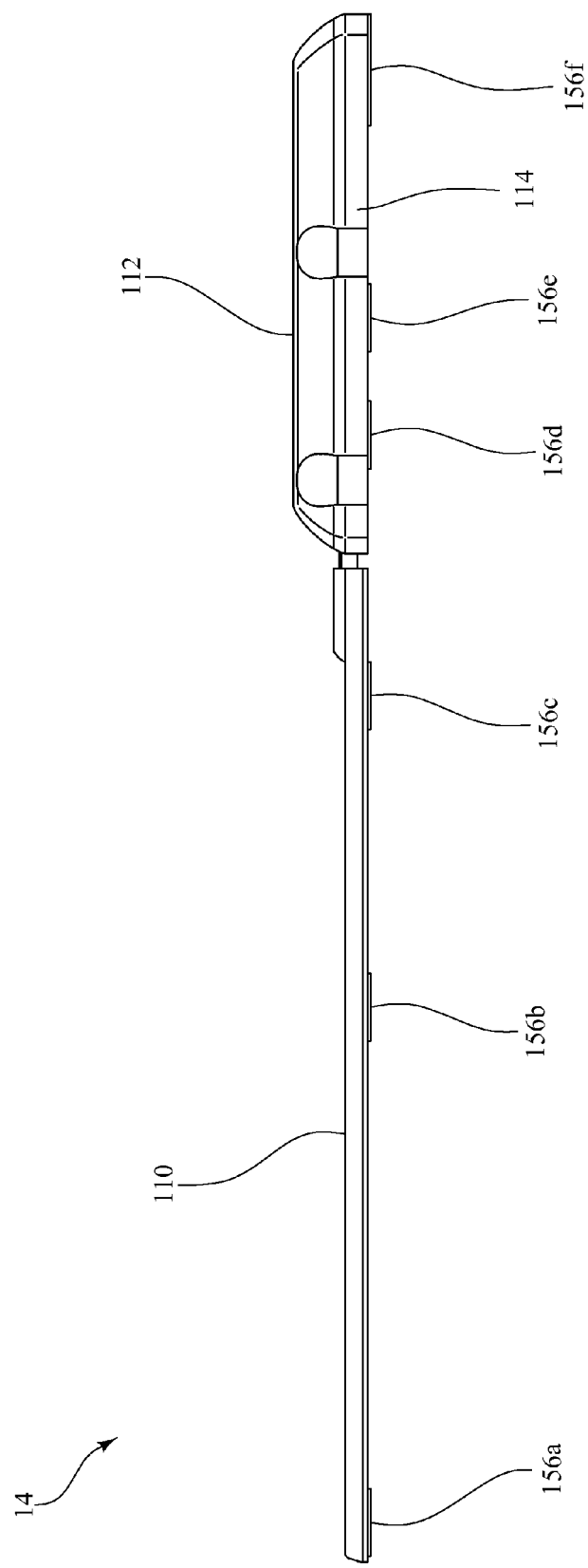
FIG. 13 is a side view of the exemplary master control unit of FIG. 9.

FIG. 9 through FIG. 13 show an exemplary master control unit 14, including a solar panel 110 and an electronics housing 112. The solar panel 110 contains the solar cells 50 (FIG. 8) and the electronics housing 112 houses the components of the electronics module 52 (FIG. 8). FIG. 11 shows the exemplary master control unit 14, where the electronics housing 112 is folded back onto the solar panel 110, exposing the underside of the electronics housing 112 and a baseplate member 114.

The solar panel 110 includes a solar film 116 placed on a rigid base sheet 118 made of a durable material, such as aluminum. The solar film 116 has power output contacts (not shown). A circuit board 120 is placed on the base sheet picking up the V+ and V− from the power output contacts of the solar film 116. Two wires 122, 124 electrically connect to the power output contacts and are soldered onto the circuit board. The solar film 116, base sheet 118, circuit board 120 and about one inch of the wires 122, 124 are then covered with weatherproof and UV stable Teflon-based coating using a process that uses heat and pressure to adhere the coating.

The baseplate member 114 is preferably injection molded using a black UV-resistant ABS plastic. A watertight first grommet 126, preferably made of a rubber material, is received in a molded recess 128 in the baseplate member 114. The two wires 122, 124 from the solar panel 110 are led through a channel 130 on the underside of the baseplate member 114. The two wires 122, 124 are then inserted through the first grommet 126. A small, round, second grommet 132 is inserted over the two wires 122, 124 and slid down about halfway down the wires 122, 124. A locking connector 134 is attached to the free end of the two wires 122, 124 so they can later plug into a battery PCB 136. The baseplate member 114 is riveted to the base sheet 118 of the solar panel 110, preferably using an Arbor press. The channel 130 containing the wires 122, 124 and the recess 128 with the first grommet 126 are then filled with a waterproof sealant, which is preferably a silicone material.

The electronics housing 112 is also preferably injection molded using a black UV-resistant ABS plastic. The electronics housing 112 houses the battery PCB 136, a main PCB 138, a cable assembly 140, the battery 58 and battery leads 142. The electronics housing 112 has a main PCB compartment 144 including mounting standoffs (not shown), a battery compartment 146, a molded battery PCB frame 148, and a cable way 150 for the wiring.

The main PCB 138 is inserted into the electronics housing 112 upside down and attached to the electronics housing 112 by fasteners, such as sheet-metal screws. The main PCB 138 includes the components (see FIG. 8) for: the microcontroller 60; the GPS receiver module 80; the local wireless network master transceiver module 82; the cellular data transceiver module 84; the bulk memory module 86; the main voltage regulator 64; GPS digital voltage regulator 92; GPS analog/ RF voltage regulator 94; the antennas 100, 106; and the Hall-Effect Sensor 70. The cable assembly 140 connects the main PCB 138 to the battery PCB 136.

The battery PCB 136 includes the components for the fuel gauge circuit 66 (FIG. 8) and receives connections for the battery leads 142, the wires 122, 124 from the solar panel 110, and the cable assembly 140 from the main PCB 138. The battery PCB 136 is inserted into the battery PCB frame 148, and held in place by friction.

The battery 58 is placed in the battery compartment 146. The battery 58 is secured in the battery compartment 146 with a silicone or double-sided tape. The purpose of this step is temporary and is intended only to keep it in place when the electronics housing 112 is flipped upside down and placed onto the baseplate 114.

The cable assembly 140 connects the main PCB 138 to the battery PCB 136. The battery leads 142 connect the battery 58 to the battery PCB 136. The two wires 122, 124 from the solar panel 110 connect the solar cells 50 to the battery PCB 136.

The baseplate member 114 serves to connect the solar panel 110 and provide a watertight pathway into the electronics housing 112 for the two wires 122, 124 from the solar panel 110. The baseplate member 114 has a gasket channel 152 adjacent to its perimeter.

In the assembly process, a gasket 154, preferably of rubber, is placed in the gasket channel 152. The small round second grommet 132 on the wires 122, 124 is inserted into the cable way 150 that helps keep the wires 122, 124 in place. The electronics housing 112 is then flipped upside down and placed on the baseplate member 114. The electronics housing 112 is attached to the baseplate member 114 using fasteners, such as screws and nuts. Threadlocker is used on the screws to help secure the screws in place. Adhesive members 156a-156f, such as a VHB tape, are attached to the bottom of the baseplate member 114 and the base sheet 118 of the solar panel 110 for attaching the master control unit 14 to an outside surface, such as a roof 28, of a liquid tanker trailer 12 (FIG. 2).

Also, prior to installation on a liquid tanker trailer 12 (FIG. 2) the magnet 72 is placed in a magnet recess 158 formed on the bottom of the baseplate member 114, as described above.

Returning now to FIG. 8, in normal operation, the solar cells 50 will maintain the battery 58 in a charged condition, and the battery will operate the master control unit 14 during periods when the solar panel 110 does not generate power. In the event that the master control unit 14 is shielded from sunlight, however, the microcontroller 60 will operatively shut down components of the master control unit 14 to conserve power. For instance, if the storage level of the battery 58 drops below a first predetermined threshold (e.g. 25%), the microcontroller 60 will turn off the cellular data transceiver module 84 except when the master control unit 14 needs to transmit data to the central tracking computer 20 (FIG. 1). If the storage level of the battery 58 further drops below a second predetermined threshold (e.g. 10%), the microcontroller 60 will continue to monitor the storage level from a "deep sleep" state, but turn all other elements of the master control unit 14 off. When charging resumes, the microcontroller 60 will wait until the battery 58 is charged to above the first predetermined threshold before it turns the other elements of the master control unit 14 back on.

Thus, the integral, one-piece master control unit 14 may be attached to an outside surface of a liquid tanker trailer 12, collect data wirelessly from the WAFLS devices 30, and transmit the data to the tracking database 22 of a central tracking computer 20 via a cellular data network 16 and the Internet 18, for access by various internet access appliances 24 over the Internet 18 (FIG. 1).

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A system for measuring and reporting changing levels of liquids in a storage tank, comprising:
    a wireless autonomous fluid level sensing device including:
        a fluid level sensor for detecting a level of liquid in the storage tank;
        an accelerometer;
        a sensing device wireless transceiver; and
        a sensing device microcontroller in communication with the fluid level sensor, the accelerometer, and the sensing device wireless transceiver, the sensing device microcontroller executing instructions for:
            detecting, using the fluid level sensor, the level of liquid in the storage tank, in response to determining, using the accelerometer, that the storage tank is not moving;
            converting the level of liquid in the storage tank into a volume of liquid in the storage tank; and
            sending, using the sensing device wireless transceiver, an alert message if the volume of liquid in the storage tank has changed from a previous volume by a threshold amount;
    a central tracking computer having a tracking database and being interfaced to the Internet; and
    a master control unit attached to the storage tank, said master control unit including:
        a solar panel for converting light-energy into electrical power;
        a control unit battery for receiving and storing said electrical power from said solar panel;
        a GPS receiver module for receiving signals from a global positioning system and determining a location of said storage tank;
        a cellular data transceiver module for communicating with said central tracking computer via a cellular data network interfaced to the Internet;
        a local wireless network master transceiver module in wireless communication with the sensing device wireless transceiver; and
        a control unit microcontroller for:
            controlling said local wireless network master transceiver module to receive the alert message from the wireless autonomous fluid level sensing device;
            controlling said GPS receiver module to obtain the location of the storage tank; and
            controlling the cellular data transceiver module to communicate, via the cellular data network and the Internet, the alert message and the location of the storage tank to the central tracking computer for storage in the tracking database.

2. The system of claim 1, wherein determining, using the accelerometer, that the storage tank is not moving comprises:
    taking a plurality of samples of each of an x-axis, a y-axis, and a z-axis of the accelerometer;

determining a standard deviation of each of the plurality of samples of each of the x-axis, the y-axis, and the z-axis of the accelerometer; and determining that the storage tank is not moving when:

the standard deviation of each of the plurality of samples of each of the x-axis, the y-axis, and the z-axis of the accelerometer is less than a predetermined constant value and the storage tank was previously determined to be still; or the storage tank was previously determined to be in motion but a percentage of the plurality of samples of each of the x-axis, the y-axis, and the z-axis of the accelerometer indicating motion over a plurality of sample cycles is less than a stillness threshold percentage value.

3. The system of claim 1, wherein the sensing device microcontroller executes further instructions for sending, using the sensing device wireless transceiver, a liquid volume status report message with a current volume of liquid in the storage tank when the volume of liquid in the storage tank has not changed for a predetermined amount of time; and wherein the control unit microcontroller is further for receiving, using the local wireless network master transceiver module, the liquid volume status report message and controlling the cellular data transceiver module to communicate, via the cellular data network and the Internet, the liquid volume status report message and the location of the storage tank to the central tracking computer for storage in the tracking database.

4. The system of claim 1, wherein the wireless autonomous fluid level sensing device further comprises a sensing device battery for use as a power source, and a power management circuit in communication with the sensing device battery and the sensing device microcontroller, the power management circuit providing voltage level detection, regulation, and control, and power switching for autonomous operation of the wireless autonomous fluid level sensing device;

wherein the sensing device microcontroller executes further instructions for sending, using the sensing device wireless transceiver, a battery status report message indicating a status of the sensing device battery; and wherein the control unit microcontroller is further for receiving, using the local wireless network master transceiver module, the battery status report message and controlling the cellular data transceiver module to communicate, via the cellular data network and the Internet, the battery status report message to the central tracking computer for storage in the tracking database.

5. The system of claim 1, wherein the control unit microcontroller is further for sending, using the local wireless network master transceiver module, a configuration message for configuring a variable parameter of the wireless autonomous fluid level sensing device; and wherein the sensing device microcontroller further executes instructions for configuring the variable parameter of the wireless autonomous fluid level sensing device in response to receiving, using the sensing device wireless transceiver, the configuration message.

6. The system of claim 1, wherein the master control unit further comprises a fuel gauge circuit, said fuel gauge circuit for communicating a power level of the control unit battery to the control unit microcontroller, said control unit microcontroller turning off said cellular data transceiver module except when the master control unit needs to transmit data when the power level of the control unit battery drops below a first predetermined threshold, said control unit microcontroller further turning off said GPS receiver module and said local wireless network master transceiver module when the power level of the control unit battery drops below a second predetermined threshold.

7. A method for measuring and reporting changing levels of liquids in a storage tank, comprising:

detecting, using a fluid level sensor of a wireless autonomous fluid level sensing device, a level of liquid in the storage tank, in response to determining, using an accelerometer, that the storage tank is not moving;

converting the level of liquid in the storage tank into a volume of liquid in the storage tank;

sending, using a sensing device wireless transceiver of the wireless autonomous fluid level sensing device, an alert message if the volume of liquid in the storage tank has changed from a previous volume by a threshold amount;

receiving, using a local wireless network master transceiver module of a master control unit, the alert message from the sensing device wireless transceiver;

obtaining, using a GPS receiver module of the master control unit, a location of the storage tank; and communicating, using a cellular data transceiver module of the master control unit, via a cellular data network and the Internet, the alert message and the location of the storage tank to a central tracking computer for storage in a tracking database.

8. The method of claim 7, wherein determining, using the accelerometer, that the storage tank is not moving comprises:

taking a plurality of samples of each of an x-axis, a y-axis, and a z-axis of the accelerometer;

determining a standard deviation of each of the plurality of samples of each of the x-axis, the y-axis, and the z-axis of the accelerometer; and determining that the storage tank is not moving when:

the standard deviation of each of the plurality of samples of each of the x-axis, the y-axis, and the z-axis of the accelerometer is less than a predetermined constant value and the storage tank was previously determined to be still; or the storage tank was previously determined to be in motion but a percentage of the plurality of samples of each of the x-axis, the y-axis, and the z-axis of the accelerometer indicating motion over a plurality of sample cycles is less than a stillness threshold percentage value.

9. The method of claim 7, further comprising:

sending, using the sensing device wireless transceiver, a liquid volume status report message with a current volume of liquid in the storage tank when the volume of liquid in the storage tank has not changed for a predetermined amount of time; and receiving, using the local wireless network master transceiver module, the liquid volume status report message and controlling the cellular data transceiver module to communicate, via the cellular data network and the Internet, the liquid volume status report message and the location of the storage tank to the central tracking computer for storage in the tracking database.

10. The method of claim 7, further comprising:

sending, using the sensing device wireless transceiver, a battery status report message indicating a status of a sensing device battery of the wireless autonomous fluid level sensing device; and receiving, using the local wireless network master transceiver module, the battery status report message and controlling the cellular data transceiver module to communicate, via the cellular data network and the Internet, the battery status report message to the central tracking computer for storage in the tracking database.

11. The method of claim 7, further comprising:
sending, using the local wireless network master transceiver module, a configuration message for configuring a variable parameter of the wireless autonomous fluid level sensing device; and
configuring the variable parameter of the wireless autonomous fluid level sensing device in response to receiving, using the sensing device wireless transceiver, the configuration message.

12. The method of claim 7, further comprising:
converting, by the master control unit, light-energy into electrical power using a solar panel;
storing said electrical power from said solar panel in a control unit battery;
receiving a power level of the control unit battery from a fuel gauge circuit;
turning off the cellular data transceiver module except when the master control unit needs to transmit data when the power level of the control unit battery drops below a first predetermined threshold; and
turning off the GPS receiver module and the local wireless network master transceiver module when the power level of the control unit battery drops below a second predetermined threshold.

13. A wireless autonomous fluid level sensing device comprising:
a fluid level sensor for detecting a level of liquid in a storage tank;
an accelerometer;
a sensing device wireless transceiver; and
a sensing device microcontroller in communication with the fluid level sensor, the accelerometer, and the sensing device wireless transceiver, the sensing device microcontroller executing instructions for:
detecting, using the fluid level sensor, the level of liquid in the storage tank, in response to determining, using the accelerometer, that the storage tank is not moving;
converting the level of liquid in the storage tank into a volume of liquid in the storage tank; and
sending, using the sensing device wireless transceiver, an alert message when the volume of liquid in the storage tank has changed from a previous volume by a threshold amount.

14. The wireless autonomous fluid level sensing device of claim 13, wherein determining, using the accelerometer, that the storage tank is not moving comprises:
taking a plurality of samples of each of an x-axis, a y-axis, and a z-axis of the accelerometer;
determining a standard deviation of each of the plurality of samples of each of the x-axis, the y-axis, and the z-axis of the accelerometer; and
determining that the storage tank is not moving when:
the standard deviation of each of the plurality of samples of each of the x-axis, the y-axis, and the z-axis of the accelerometer is less than a predetermined constant value and the storage tank was previously determined to be still; or
the storage tank was previously determined to be in motion but a percentage of the plurality of samples of each of the x-axis, the y-axis, and the z-axis of the accelerometer indicating motion over a plurality of sample cycles is less than a stillness threshold percentage value.

15. The wireless autonomous fluid level sensing device of claim 13, wherein the sensing device microcontroller executes further instructions for sending, using the sensing device wireless transceiver, a status report message with a current volume of liquid in the storage tank when the volume of liquid in the storage tank has not changed for a predetermined amount of time.

16. The wireless autonomous fluid level sensing device of claim 13, further comprising a sensing device battery for use as a power source, and a power management circuit in communication with the sensing device battery and the sensing device microcontroller, the power management circuit providing voltage level detection, regulation, and control, and power switching for autonomous operation of the wireless autonomous fluid level sensing device.

17. The wireless autonomous fluid level sensing device of claim 13, further comprising a magnetic detector in communication with the sensing device microcontroller, wherein the sensing device microcontroller further executes instructions for initializing the fluid level sensor, the accelerometer, and the sensing device wireless transceiver in response to detecting, using the magnetic detector, that a magnet has been positioned in proximity to the magnetic detector.

18. The wireless autonomous fluid level sensing device of claim 13, wherein the sensing device microcontroller further executes instructions for configuring a variable parameter in response to receiving, using the sensing device wireless transceiver, a configuration message.

19. The wireless autonomous fluid level sensing device of claim 13, further comprising a temperature sensor in communication with the sensing device microcontroller, the temperature sensor for detecting an ambient temperature value of the wireless autonomous fluid level sensing device, wherein the sensing device microcontroller further executes instructions for adjusting the volume of liquid in the storage tank based on the ambient temperature value.

20. The wireless autonomous fluid level sensing device of claim 13, further comprising an intrinsically safe barrier device for providing intrinsically safe communications between the sensing device microcontroller and the fluid level sensor.

21. A method of operating a wireless autonomous fluid level sensing device, comprising:
detecting, using a fluid level sensor, a level of liquid in a storage tank, in response to determining, using an accelerometer, that the storage tank is not moving;
converting, using a sensing device microcontroller, the level of liquid in the storage tank into a volume of liquid in the storage tank; and
sending, using a sensing device wireless transceiver, an alert message if the volume of liquid in the storage tank has changed from a previous volume by a threshold amount.

22. The method of operating a wireless autonomous fluid level sensing device of claim 21, wherein determining that the storage tank is not moving comprises:
taking a plurality of samples of each of an x-axis, a y-axis, and a z-axis of the accelerometer;
determining a standard deviation of each of the plurality of samples of each of the x-axis, the y-axis, and the z-axis of the accelerometer;
determining that the storage tank is not moving when:
the standard deviation of each of the plurality of samples of each of the x-axis, the y-axis, and the z-axis of the accelerometer is less than a predetermined constant value and the storage tank was previously determined to be still; or the storage tank was previously determined to be in motion but a percentage of the plurality of samples of each of the x-axis, the y-axis, and the z-axis of the accelerometer indicating motion over a plurality of sample cycles is less than a stillness threshold percentage value.

23. The method of operating a wireless autonomous fluid level sensing device of claim 21, further comprising initializing the fluid level sensor, the accelerometer, and the sensing device wireless transceiver in response to detecting, using a magnetic detector, that a magnet has been positioned in proximity to the magnetic detector.

24. The method of operating a wireless autonomous fluid level sensing device of claim 21, further comprising:
- detecting, using a temperature sensor, an ambient temperature value of the wireless autonomous fluid level sensing device; and
- adjusting the volume of liquid in the storage tank based on the ambient temperature value.

* * * * *